(12) United States Patent
Matsumoto et al.

(10) Patent No.: US 12,137,042 B2
(45) Date of Patent: Nov. 5, 2024

(54) MANAGEMENT APPARATUS OR DEVICE INFORMATION TRANSMITTING APPARATUS

(71) Applicant: DAIKIN INDUSTRIES, LTD., Osaka (JP)

(72) Inventors: Erika Matsumoto, Osaka (JP); Gou Nakatsuka, Osaka (JP)

(73) Assignee: Daikin Industries, Ltd., Osaka (JP)

( * ) Notice: Subject to any disclaimer, the term of this patent is extended or adjusted under 35 U.S.C. 154(b) by 548 days.

(21) Appl. No.: 17/427,020

(22) PCT Filed: Feb. 4, 2020

(86) PCT No.: PCT/JP2020/004085
§ 371 (c)(1),
(2) Date: Jul. 29, 2021

(87) PCT Pub. No.: WO2020/162444
PCT Pub. Date: Aug. 13, 2020

(65) Prior Publication Data
US 2022/0131776 A1   Apr. 28, 2022

(30) Foreign Application Priority Data
Feb. 7, 2019   (JP) .................................. 2019-020919

(51) Int. Cl.
H04L 43/08       (2022.01)
F24F 11/56       (2018.01)

(52) U.S. Cl.
CPC .............. H04L 43/08 (2013.01); F24F 11/56 (2018.01)

(58) Field of Classification Search
None
See application file for complete search history.

(56) References Cited

U.S. PATENT DOCUMENTS

2011/0307099 A1   12/2011   Kumata et al.
2018/0338290 A1*  11/2018   Tashiro .................. G08C 17/02
(Continued)

FOREIGN PATENT DOCUMENTS

EP   3 193 510 A1   7/2017
EP   3 605 485 A1   2/2020
(Continued)

OTHER PUBLICATIONS

International Search Report of corresponding PCT Application No. PCT/JP2020/004085 dated Mar. 31, 2020.
(Continued)

*Primary Examiner* — Carlos R Ortiz Rodriguez
(74) *Attorney, Agent, or Firm* — Global IP Counselors, LLP

(57) ABSTRACT

A management apparatus communicates with a device information transmitting apparatus via a communication network under a predetermined communication condition. The device information transmitting apparatus transmits device information about a predetermined device. The management apparatus includes a first measuring unit that measures communication quality in the communication network, a first determining unit that determines a degree of decrease in the communication quality, and a first control unit that executes first control in accordance with the degree of decrease in the communication quality. In the first control, the first control unit changes the communication condition in accordance with a degree of priority of each of a plurality of pieces of information transmitted between the device information transmitting apparatus and the management apparatus.

20 Claims, 10 Drawing Sheets

(56) References Cited

U.S. PATENT DOCUMENTS

2020/0025403 A1  1/2020  Oumi et al.
2020/0088435 A1  3/2020  Inoue

FOREIGN PATENT DOCUMENTS

| | | |
|---|---|---|
| JP | 2010-210209 A | 9/2010 |
| JP | 2018-173766 A | 11/2018 |
| JP | 2018-174528 A | 11/2018 |
| WO | 2016/038903 A1 | 3/2016 |
| WO | 2018/062555 A1 | 4/2018 |
| WO | 2018/220898 A1 | 12/2018 |

OTHER PUBLICATIONS

European Search Report of corresponding EP Application No. 20 752 296.2 dated Mar. 30, 2022.
International Preliminary Report of corresponding PCT Application No. PCT/JP2020/004085 dated Aug. 19, 2021.

\* cited by examiner (a) FIRST COMMUNICATION CONDITION A1

|  | AIR CONDITIONER 10a | AIR CONDITIONER 10b | AIR CONDITIONER 10c |
|---|---|---|---|
| FREQUENCY | ONCE PER 3 MINUTES | ONCE PER 3 MINUTES | ONCE PER 3 MINUTES |
| INFORMATION TO BE TRANSMITTED | FIRST STATE INFORMATION D1 SECOND STATE INFORMATION D2 THIRD STATE INFORMATION D3 | FIRST STATE INFORMATION D1 SECOND STATE INFORMATION D2 THIRD STATE INFORMATION D3 | FIRST STATE INFORMATION D1 SECOND STATE INFORMATION D2 THIRD STATE INFORMATION D3 |

(b) SECOND COMMUNICATION CONDITION A2

|  | AIR CONDITIONER 10a | AIR CONDITIONER 10b | AIR CONDITIONER 10c |
|---|---|---|---|
| FREQUENCY | ONCE PER 10 MINUTES | ONCE PER 10 MINUTES | ONCE PER 10 MINUTES |
| INFORMATION TO BE TRANSMITTED | FIRST STATE INFORMATION D1 | FIRST STATE INFORMATION D1 | FIRST STATE INFORMATION D1 |

(c) THIRD COMMUNICATION CONDITION A3

|  | AIR CONDITIONER WITHIN PREDETERMINED TIME AFTER ACTIVATION | AIR CONDITIONER OUT OF PREDETERMINED TIME AFTER ACTIVATION |
|---|---|---|
| FREQUENCY | ONCE PER 3 MINUTES | ONCE PER 10 MINUTES |
| INFORMATION TO BE TRANSMITTED | FIRST STATE INFORMATION D1 SECOND STATE INFORMATION D2 THIRD STATE INFORMATION D3 | FIRST STATE INFORMATION D1 SECOND STATE INFORMATION D2 |

| ATTRIBUTE | | | | ITEM |
|---|---|---|---|---|
| AIR CONDITIONING ENTITY | AIR CONDITIONER | TYPE | | ROOM AIR CONDITIONER, MULTI-AIR CONDITIONER FOR BUILDING |
| | | STATE | | RIGHT AFTER ACTIVATION |
| | | | | THERMO-ON/OFF |
| | | | | ABNORMAL |
| | | | | 1 WEEK AFTER TEST RUN |
| | | | | RIGHT AFTER HUMAN OPERATION |
| | | INSTRUCTION | MANUAL | DURING COLLECTIVE OPERATION |
| | | | | NUMBER OF OPERATIONS |
| | | | | FREQUENCY OF OPERATION |
| | | | | DETAILS OF OPERATION |
| | | | | OPERATION HISTORY |
| | | | AUTO | TEMPERATURE CONTROL APPLICATION |
| AIR CONDITIONING ENVIRONMENT | TARGET SPACE OF AIR CONDITIONING | TYPE | | PRESIDENT ROOM, SERVER ROOM, CORRIDOR |
| | | INSTALLATION ENVIRONMENT | | PERIMETER, INTERIOR |
| | | STATE | | OPENED/CLOSED DOOR, OPENED/CLOSED WINDOW, ILLUMINANCE |
| | | EXTERNAL FACTOR | | WEATHER, METEOROLOGICAL DISASTER |
| | TARGET PERSON OF AIR CONDITIONING | PRESENCE | | PRESENCE INFORMATION |
| | | | | HISTORY OF PRESENCE INFORMATION |
| | | | | HUMAN DETECTION SENSOR |
| | | | | OPERATION SCHEDULE |
| | | | | STAY TIME |
| | | STATE | | AMOUNT OF ACTIVITY |
| | | | | BIOLOGICAL INFORMATION |
| | | | | DEGREE OF COMFORT |
| | | INTENTION | | INSTRUCTION BASED ON INTENTION |
| | | ATTRIBUTE | | AGE |
| | | | | SEX |
| | | | | POST (PRESIDENT, DIRECTOR, ORDINARY EMPLOYEE) |
| | | | | ROLE (BUILDING MANAGER, USER) |
| | TARGET ITEM OF AIR CONDITIONING | PRESENCE | | PRESENCE INFORMATION |
| | | STATE | | STATE OF FRUIT |
| | | SERVICE | | ALIVE MONITORING, ENERGY SAVING CONTROL, CONTROL RELATED TO FEE OF DEMAND CONTROL OR THE LIKE |
| TIME | | TIME SECTION | | MORNING, DAYTIME, EVENING, NIGHT |
| | | BUSINESS HOURS | | WITHIN ON-DUTY HOURS, OVERTIME HOURS, NIGHTTIME |
| | | DEMAND RESPONSE | | AT START, BEFORE END |

FIG. 5

DETERMINATION OF DEGREE OF PRIORITY BASED
ON TIME SERIES DURING DEMAND CONTROL

|  | POWER SUPPRESSION INSTRUCTION |
|---|---|
| FORMER 15 MINUTES OF DEMAND CONTROL | DEGREE OF PRIORITY: LOW |
| LATTER 15 MINUTES OF DEMAND CONTROL | DEGREE OF PRIORITY: HIGH |

FIG. 6

DETERMINATION OF DEGREE OF PRIORITY BASED ON USAGE
STATUS OF TARGET PERSON OF AIR CONDITIONING

|  | SETTING INFORMATION (MANAGEMENT APPARATUS → CONTROL TERMINAL) | SETTING INFORMATION (CONTROL TERMINAL → MANAGEMENT APPARATUS) |
|---|---|---|
| DURING OPERATION FROM NETWORK SIDE | DEGREE OF PRIORITY: HIGH | DEGREE OF PRIORITY: LOW |
| DURING OPERATION FROM LOCAL SIDE | DEGREE OF PRIORITY: LOW | DEGREE OF PRIORITY: HIGH |

FIG. 7

DETERMINATION OF DEGREE OF PRIORITY BASED ON DEGREE
OF COMFORT OF TARGET PERSON OF AIR CONDITIONING

|  | BIOLOGICAL INFORMATION | INFORMATION ABOUT CURRENT STATE |
|---|---|---|
| DEGREE OF COMFORT: HIGH | DEGREE OF PRIORITY: HIGH | DEGREE OF PRIORITY: LOW |
| DEGREE OF COMFORT: LOW | DEGREE OF PRIORITY: LOW | DEGREE OF PRIORITY: HIGH |

FIG. 8

DETERMINATION OF DEGREE OF PRIORITY BASED ON
PRESENCE OR ABSENCE OF USER OF AIR CONDITIONING

|  | INFORMATION ABOUT CURRENT STATE |
|---|---|
| USER: PRESENT | DEGREE OF PRIORITY: HIGH |
| USER: ABSENT | DEGREE OF PRIORITY: LOW |

FIG. 9

MANAGEMENT APPARATUS OR DEVICE INFORMATION TRANSMITTING APPARATUS

CROSS-REFERENCE TO RELATED APPLICATIONS

This U.S. National stage application claims priority under 35 U.S.C. § 119(a) to Japanese Patent Application No. 2019-020919, filed in Japan on Feb. 7, 2019, the entire contents of which are hereby incorporated herein by reference.

BACKGROUND

Field of the Invention

The present disclosure relates to a management apparatus or a device information transmitting apparatus.

BACKGROUND INFORMATION

Hitherto, there has been a system in which a device information transmitting apparatus and a management apparatus communicate with each other via a communication network. For example, Japanese Unexamined Patent Application Publication No. 2010-210209discloses a system in which an information transmitting apparatus that transmits information about an air conditioner at a predetermined timing and a management apparatus that manages a plurality of air conditioners communicate with each other via the Internet.

SUMMARY

In the foregoing system, it may be difficult to transmit and receive information that is necessary for operating the system when communication quality in the communication network decreases. Such a situation is to be suppressed.

A management apparatus according to a first aspect communicates with a device information transmitting apparatus via a communication network under a predetermined communication condition. The device information transmitting apparatus is an apparatus that transmits device information. The device information is information about a predetermined device. The management apparatus includes a first measuring unit, a first determining unit, and a first control unit. The first measuring unit measures communication quality in the communication network. The first determining unit determines a degree of decrease in the communication quality. The first control unit executes first control in accordance with the degree of decrease in the communication quality. In the first control, the first control unit changes the communication condition in accordance with a degree of priority of each of pieces of information transmitted between the device information transmitting apparatus and the management apparatus.

Accordingly, even in a case where the communication quality in the communication network decreases in the communication between the management apparatus and the device information transmitting apparatus via the communication network, necessary information can be transmitted and received.

The "first control" herein may include not only a single process but also a plurality of processes.

The "communication condition" herein is not limited and may be any condition related to communication between the management apparatus and the device information transmitting apparatus and related to the amount of communication. For example, the "communication condition" herein is the timing to transmit or receive information, the number of transmissions or receptions of information, the details of information that is transmitted or received, or the like, between the management apparatus and the device information transmitting apparatus.

The "degree of priority" herein is the degree of priority of information transmitted between the management apparatus and the device information transmitting apparatus and is, for example, individually determined in accordance with the degree of importance of each piece of information. For example, the degree of priority is individually determined in accordance with the degree of necessity of each piece of information in operating the system including the device information transmitting apparatus and the management apparatus. For example, the degree of priority is determined in accordance with a condition (for example, a type, a place of disposition, an ability, or the like) of the device that transmits or receives information.

A management apparatus according to a second aspect is the management apparatus according to the first aspect, in which, in the first control, the first control unit changes the communication condition regarding transmission of information from the management apparatus to the device information transmitting apparatus. Accordingly, in a case where the communication quality in the communication network decreases in the communication between the management apparatus and the device information transmitting apparatus via the communication network, the communication condition is changed regarding transmission of information from the management apparatus to the device information transmitting apparatus.

A management apparatus according to a third aspect is the management apparatus according to the first or second aspect, in which, in the first control, the first control unit transmits, to the device information transmitting apparatus, an instruction to change the communication condition regarding transmission of information from the device information transmitting apparatus to the management apparatus. Accordingly, in a case where the communication quality in the communication network decreases in the communication between the management apparatus and the device information transmitting apparatus via the communication network, the communication condition is changed regarding transmission of information from the device information transmitting apparatus to the management apparatus.

A management apparatus according to a fourth aspect is the management apparatus according to any one of the first to third aspects, in which the device includes an air conditioner. The degree of priority is determined based on at least one of an installation status of the air conditioner, a usage status of the air conditioner, an attribute of the air conditioner, and a monitoring purpose of the air conditioner. Accordingly, in a case where the communication quality in the communication network decreases in the communication between the management apparatus and the device information transmitting apparatus in the system that manages the air conditioner via the communication network, the communication condition can be finely determined. The "usage status" herein is, for example, the operation state, operation time section of the air conditioner or the like. The "monitoring purpose" herein includes whether there is a monitoring purpose and/or the details of the monitoring purpose.

A management apparatus according to a fifth aspect is the management apparatus according to any one of the first to fourth aspects, which further includes a first notifying unit. The first notifying unit notifies a predetermined information output terminal that the first control is being executed, when the first control unit executes the first control. Accordingly, a user or a system operator is able to grasp that the first control is being executed.

A management apparatus according to a sixth aspect is the management apparatus according to any one of the first to fifth aspects, in which the first control unit suspends or stops the first control in response to receipt of, from another apparatus, a command of suspending or stopping execution of the first control. Accordingly, it is possible to determine execution, and suspension or stop of the first control as appropriate.

A management apparatus according to a seventh aspect is the management apparatus according to any one of the first to sixth aspects, in which the first determining unit determines the communication quality, based on a reference value of the communication quality, the reference value being determined based on a result of measurement of the communication quality during a predetermined period. Accordingly, it is possible to accurately determine the degree of decrease in the communication quality. The "predetermined period" is appropriately set in accordance with design specifications or an installation environment.

A management apparatus according to an eighth aspect is the management apparatus according to the seventh aspect, in which a reference value is determined by another information processing apparatus. Accordingly, it is possible to appropriately set a trigger for the first control.

A device information transmitting apparatus according to a ninth aspect communicates with a management apparatus via a communication network under a predetermined communication condition and transmits device information. The device information is information about a predetermined device. The device information transmitting apparatus includes a second measuring unit, a second determining unit, and a second control unit. The second measuring unit measures communication quality in the communication network. The second determining unit determines a degree of decrease in the communication quality. The second control unit executes second control. The second control is control executed in accordance with the degree of decrease in the communication quality. In the second control, the second control unit changes the communication condition in accordance with a degree of priority of each of pieces of information transmitted between the device information transmitting apparatus and the management apparatus.

Accordingly, even in a case where the communication quality in the communication network decreases in the communication between the management apparatus and the device information transmitting apparatus via the communication network, necessary information can be transmitted and received.

The "second control" herein may include not only a single process but also a plurality of processes.

The "communication condition" herein is not limited and may be any condition related to communication between the management apparatus and the device information transmitting apparatus and related to the amount of communication. For example, the "communication condition" herein is the timing to transmit or receive information, the number of transmissions or receptions of information, the details of information that is transmitted or received, or the like, between the management apparatus and the device information transmitting apparatus.

The "degree of priority" herein is the degree of priority of information transmitted between the management apparatus and the device information transmitting apparatus and is, for example, individually determined in accordance with the degree of importance of each piece of information. For example, the degree of priority is individually determined in accordance with the degree of necessity of each piece of information in operating the system including the device information transmitting apparatus and the management apparatus.

A device information transmitting apparatus according to a tenth aspect is the device information transmitting apparatus according to the ninth aspect, in which, in the second control, the second control unit changes the communication condition regarding transmission of information from the device information transmitting apparatus to the management apparatus. Accordingly, in a case where the communication quality in the communication network decreases in the communication between the management apparatus and the device information transmitting apparatus via the communication network, the communication condition is changed regarding transmission of information from the device information transmitting apparatus to the management apparatus.

A device information transmitting apparatus according to an eleventh aspect is the device information transmitting apparatus according to the ninth or tenth aspect, in which, in the second control, the second control unit transmits, to the management apparatus, an instruction to change the communication condition regarding transmission of information from the management apparatus to the device information transmitting apparatus. Accordingly, in a case where the communication quality in the communication network decreases in the communication between the management apparatus and the device information transmitting apparatus via the communication network, the communication condition is changed regarding transmission of information from the management apparatus to the device information transmitting apparatus.

A device information transmitting apparatus according to a twelfth aspect is the device information transmitting apparatus according to any one of the ninth to eleventh aspects, in which the device includes an air conditioner. The degree of priority is determined based on at least one of an installation status of the air conditioner, a usage status of the air conditioner, an attribute of the air conditioner, and a monitoring purpose of the air conditioner. Accordingly, in a case where the communication quality in the communication network decreases in the communication between the management apparatus and the device information transmitting apparatus in the system that manages the air conditioner via the communication network, the communication condition can be finely determined. The "usage status" herein is, for example, the operation state, operation time section of the air conditioner or the like. The "monitoring purpose" herein includes whether there is a monitoring purpose and/or the details of the monitoring purpose.

A device information transmitting apparatus according to a thirteenth aspect is the device information transmitting apparatus according to any one of the ninth to twelfth aspects and further includes a second notifying unit. The second notifying unit notifies a predetermined information output terminal that the second control is being executed, when the second control unit executes the second control. Accordingly, a user or a system operator is able to grasp that the second control is being executed.

A device information transmitting apparatus according to a fourteenth aspect is the device information transmitting apparatus according to any one of the ninth to thirteenth aspects, in which the second control unit suspends or stops the second control in response to receipt of, from another apparatus, a command of suspending or stopping execution of the second control. Accordingly, it is possible to determine execution, and suspension or stop of the second control as appropriate.

A device information transmitting apparatus according to a fifteenth aspect is the device information transmitting apparatus according to any one of the ninth to fourteenth aspects, in which the second determining unit determines the communication quality, based on a reference value of the communication quality, the reference value being determined based on a result of measurement of the communication quality during a predetermined period. Accordingly, it is possible to accurately determine the degree of decrease in the communication quality. The "predetermined period" is appropriately set in accordance with design specifications or an installation environment.

A device information transmitting apparatus according to a sixteenth aspect is the device information transmitting apparatus according to the fifteenth aspect, in which the reference value is determined by another information processing apparatus. Accordingly, it is possible to appropriately set a trigger for the second control.

BRIEF DESCRIPTION OF DRAWINGS

FIG. 4 is a schematic diagram illustrating an example of communication conditions related to communication between a management apparatus and one control terminal.

FIG. 5 is a schematic diagram illustrating an example of information that is taken into account in determining the degree of priority.

FIG. 6 is a schematic diagram illustrating an example of a manner of determining the degree of priority.

FIG. 7 is a schematic diagram illustrating an example of a manner of determining the degree of priority.

FIG. 8 is a schematic diagram illustrating an example of a manner of determining the degree of priority.

FIG. 9 is a schematic diagram illustrating an example of a manner of determining the degree of priority.

DETAILED DESCRIPTION OF EMBODIMENT(S)

First Embodiment

Hereinafter, a device management system 1 according to a first embodiment of the present disclosure will be described. The following embodiment is a specific example, does not limit the technical scope, and can be appropriately changed without deviating from the gist.

(1) OVERALL CONFIGURATION

Figure 1:
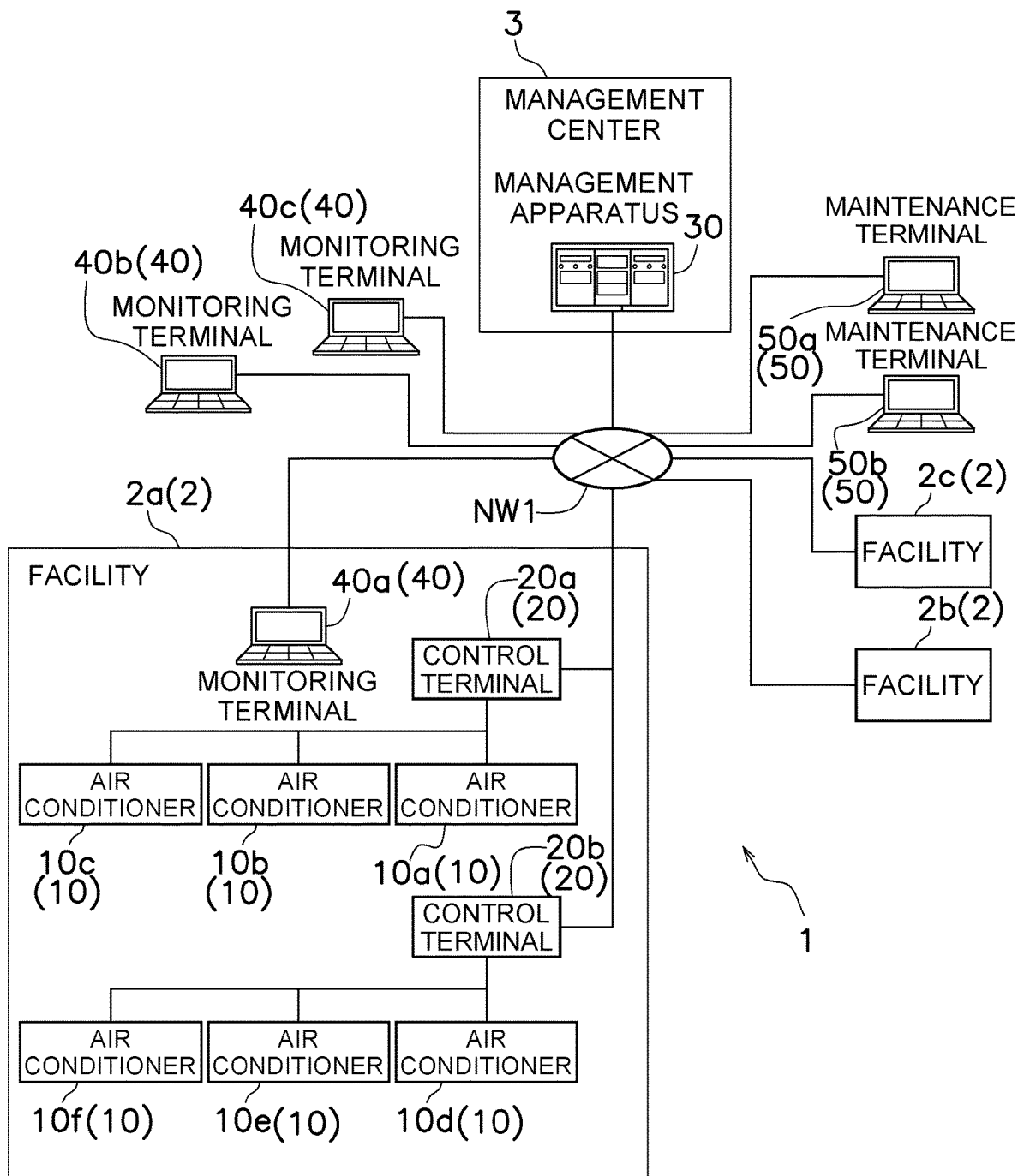
FIG. 1 is a schematic diagram illustrating the configuration of a device management system.

FIG. 1 is a schematic diagram illustrating the configuration of the device management system 1 according to one embodiment of the present disclosure. In the following description, a plurality of apparatuses having similar functions are denoted by the same reference numerals when a common description is given about the apparatuses. When one of a plurality of apparatuses having similar functions is described by being distinguished from the others, a lower-case alphabetic letter is attached to the reference numeral denoting the apparatus. For example, control terminals 20a to 20c, which are apparatuses having similar functions, will be referred to as control terminals 20 when a common description is given about them. Although the letters "a" to "c" and the like are attached to reference numerals for convenience of description, these letters represent an exemplary number, and the number is not limited thereto.

The device management system 1 is a system in which a single management apparatus 30 manages many devices. Here, the management apparatus 30 is installed in a central management center 3. There are many facilities 2a to 2c in a jurisdiction area of the central management center 3. The facilities 2a to 2c are, for example, an office building, a commercial building, and a condominium. One or a plurality of air conditioners 10a to 10f, which are an example of devices to be managed, are installed in each of the facilities 2a to 2c. Each of the air conditioners 10a to 10f is connected to any one of the plurality of control terminals 20a and 20b. In the device management system 1, the individual control terminals 20a and 20b and the management apparatus 30 communicate device information, which will be described below, and thus the plurality of air conditioners 10a to 10f are managed.

The management apparatus 30 is connected to a plurality of monitoring terminals 40a to 40c and a plurality of maintenance terminals 50a and 50b via a communication network NW1. When an anomaly notice is made regarding any one of the air conditioners 10a to 10f, the management apparatus 30 notifies an operator or the like of the monitoring terminals 40a to 40c or the maintenance terminals 50a and 50b that the anomaly notice has been made. The communication network NW1 includes a wide area network (WAN) connected to a plurality of properties. For example, the communication network NW1 includes the Internet.

The number of control terminals 20, the number of monitoring terminals 40, and/or the number of maintenance terminals 50 can be changed as appropriate. Also, the number of facilities 2 and/or the number of management centers 3 can be changed as appropriate.

(2) MANAGEMENT TARGET (DEVICE) IN DEVICE MANAGEMENT SYSTEM 1

Hereinafter, an "air conditioner" that cools or warms a target space will be described as an example of a device serving as a management target in the device management system 1 according to the present embodiment. Note that the management target in the device management system 1 according to the present embodiment is not limited to an air conditioner, and any device having the following feature can be adopted. For example, a ventilation device, a humidity adjusting device, an air handling unit, a chiller unit, and/or another refrigeration device or the like may be adopted as a "device".

Figure 2:
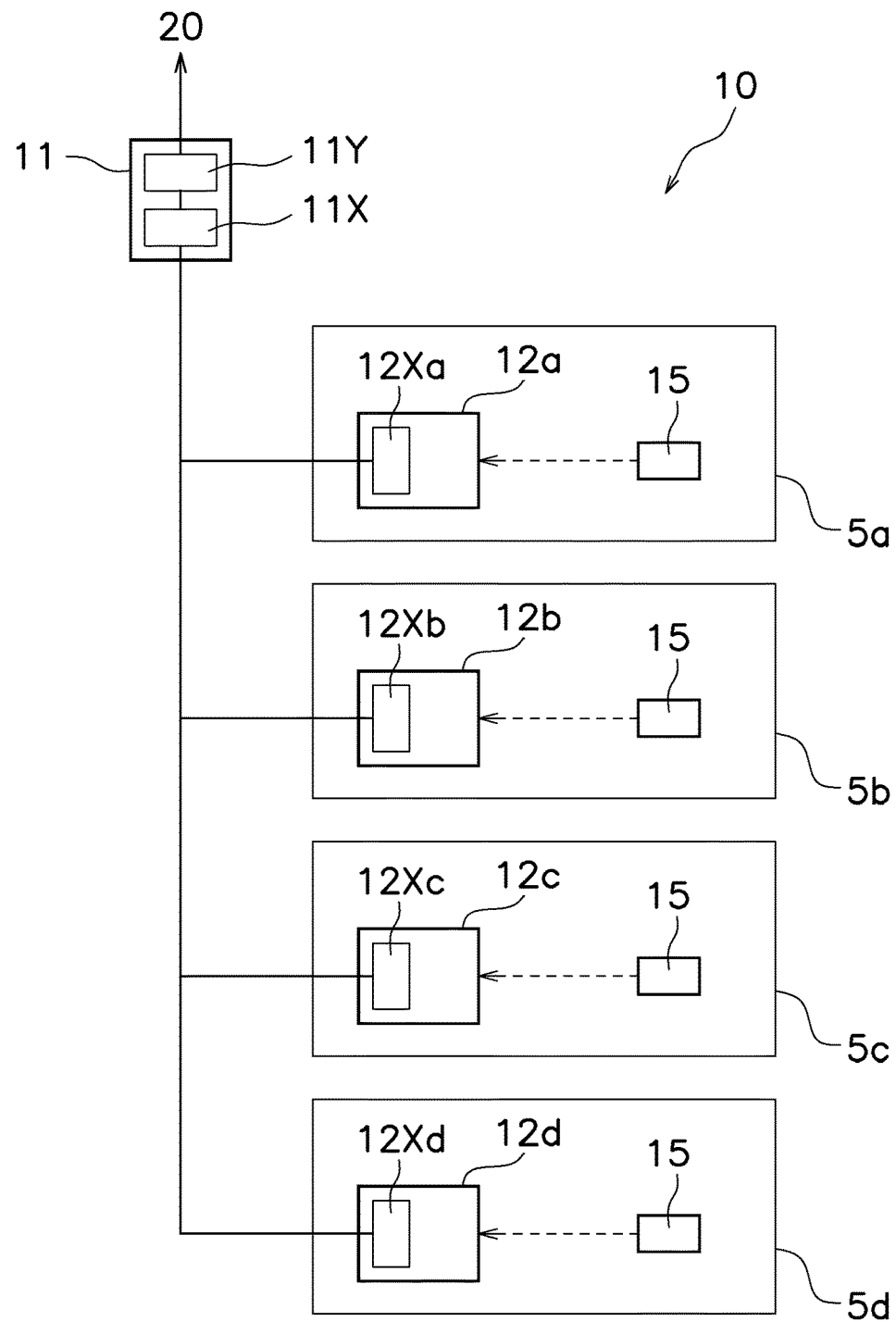
FIG. 2 is a schematic diagram illustrating the configuration of an air conditioner.

FIG. 2 is a schematic diagram illustrating the configuration of the air conditioner 10 according to the present embodiment. The air conditioner 10 includes a refrigerant circuit constituted by a compressor, a heat exchanger, and the like which are not illustrated. The air conditioner 10 includes an outdoor unit 11 and a plurality of indoor units 12a to 12d. The outdoor unit 11 is connected to the individual indoor units 12 through dedicated communication lines. The outdoor unit 11 includes an outdoor unit control circuit 11X. The indoor units 12a to 12d include indoor unit control circuits 12Xa to 12Xd, respectively. The air conditioner 10 has various sensors that are appropriately attached to predetermined positions. These sensors detect at least any one of a room temperature, an ambient outside temperature, a temperature and pressure of refrigerant sucked into the compressor, a temperature and pressure of refrigerant discharged from the compressor, a temperature of refrigerant in an evaporator, and a temperature of refrigerant in a condenser. On the basis of detected values of the various sensors, the outdoor unit control circuit 11X and the indoor unit control circuits 12X cooperate with each other to control the operations of individual parts of the air conditioner 10. The air conditioner 10 is operated on the basis of control information input from an operation terminal 15, such as a remote controller and/or an operation panel, and control information input from the external monitoring terminal 40 via the communication network NW1.

The outdoor unit 11 is a device that functions as a heat source of the refrigerant circuit. The outdoor unit 11 includes a connection unit 11Y mounted therein. The outdoor unit control circuit 11X transmits information to and receives information from the control terminal 20 via the connection unit 11Y. The outdoor unit 11 is installed, for example, on a roof, in an underground room, or the like.

The indoor unit 12 is operated by the operation terminal 15 installed indoors. The operation terminal 15 is constituted by, for example, a remote controller and an operation panel or the like attached indoors. Here, the plurality of indoor units 12a to 12d connected to the single outdoor unit 11 are operated while individually being associated with one or a plurality of operation terminals 15. A human detection sensor or the like that detects the presence of a person may be mounted on the indoor unit 12. The indoor units 12a to 12d are installed in installation spaces 5a to 5d, such as a plurality of floors or a plurality of rooms of the facility 2, in a dispersed manner.

(3) DETAILED CONFIGURATION OF DEVICE MANAGEMENT SYSTEM 1

Figure 3:
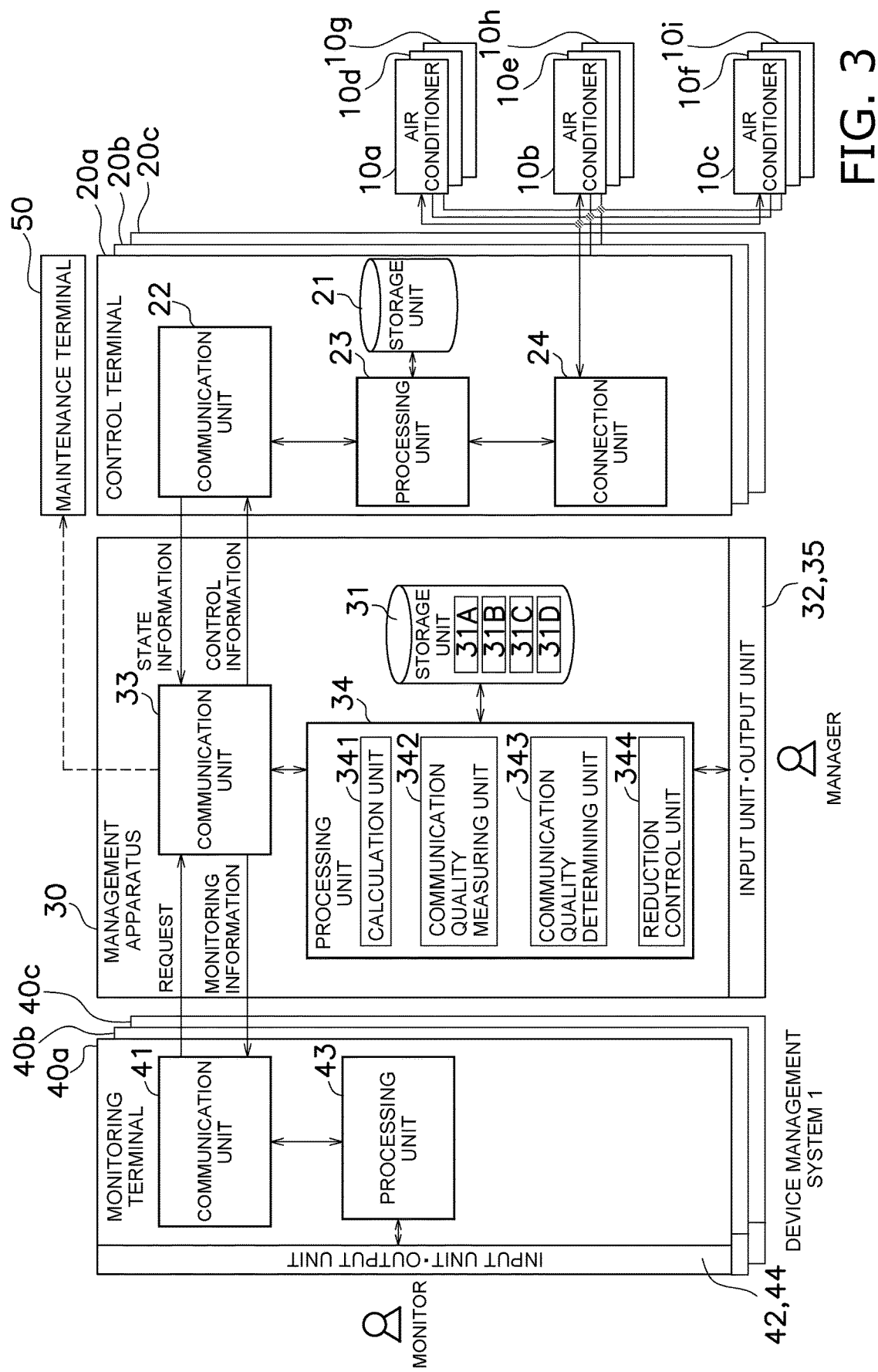
FIG. 3 is a schematic diagram illustrating functional blocks of individual apparatuses constituting a device management system according to a first embodiment.

FIG. 3 is a schematic diagram illustrating functional blocks of the individual apparatuses constituting the device management system 1 according to the present embodiment.
(3-1) Control Terminal (Device Information Transmitting Apparatus)

The control terminal 20 connects to the outdoor unit control circuit 11X, thereby controlling the air conditioner 10. As illustrated in FIG. 3, each control terminal 20 includes a storage unit 21, a communication unit 22, a processing unit 23, and a connection unit 24.

The storage unit 21 stores various pieces of information and is constituted by a nonvolatile memory, a volatile memory, and the like. For example, the storage unit 21 stores a program for executing various functions of the control terminal 20. The storage unit 21 stores "device information" transmitted between the control terminal 20 and the management apparatus 30, "communication conditions" related to transmission of the device information, and so forth.

"Device information" is a plurality of types of information about the air conditioner (device) 10, which is a management target, and is broadly classified into, for example, "state information" indicating the state of the air conditioner 10 and "control information" for controlling various states of the air conditioner 10. "State information" is classified into first state information D1, second state information D2, and third state information D3 in descending order of the degree of priority. The "degree of priority" is the degree of priority of information transmitted between the management apparatus 30 and the control terminal 20 and is, for example, individually determined in accordance with the degree of importance of each piece of information. For example, the degree of priority is individually determined in accordance with the degree of necessity of each piece of information in operating the system including the management apparatus 30 and the control terminal 20. For example, the degree of priority is determined in accordance with a condition (for example, a type, a place of disposition, an ability, or the like) of the device that transmits or receives information.

In the present embodiment, the first state information D1 is information having the highest degree of priority. The first state information D1 is, for example, information such as an anomaly notice indicating that a serious anomaly has occurred in a device.

The second state information D2 is information having the second highest degree of priority. The second state information D2 is, for example, control information of an electric valve, motor, or another actuator belonging to the air conditioner 10, and information of detected values or the like of various sensors installed in the air conditioner 10.

The third state information D3 is information having the third highest degree of priority. The third state information D3 is, for example, information for acquiring characteristics of a user, and corresponds to an operation history or the like of the operation terminal 15. The classification of individual pieces of state information is not limited to that described above and can be set in any manner by a manager or the like.

The storage unit 21 stores communication conditions related to transmission of the plurality of types of state information in association with each air conditioner 10. A "communication condition" is a condition related to communication between the management apparatus 30 and the control terminal 20, and is a condition related to the amount of communication. For example, a "communication condition" individually defines the timing to transmit or receive information, the number of transmissions or receptions of information, the details of information that is transmitted or received, or the like, regarding communication between the management apparatus 30 and each control terminal 20.

FIG. 4 is a schematic diagram illustrating an example of communication conditions related to communication between the management apparatus 30 and one control terminal 20a. The communication conditions between the management apparatus 30 and the one control terminal 20a include, for example, a first communication condition A1, a second communication condition A2, a third communication condition A3, and the like illustrated in parts (a) to (c) of FIG. 4.

The first communication condition A1 in FIG. 4 defines that the first state information D1, the second state information D2, and the third state information D3 are transmitted to the management apparatus 30 at a frequency of once per three minutes regarding each of the corresponding air conditioners 10 (10a, 10b, 10c) (part (a) of FIG. 4). The first communication condition A1 is selected, for example, in a normal state (when the degree of communication quality in the communication network NW1 is not high).

The second communication condition A2 in FIG. 4 defines that only the first state information D1 is transmitted to the management apparatus 30 at a frequency of once per ten minutes regarding each of the corresponding air conditioners 10 (10a, 10b, 10c) (part (b) of FIG. 4). The second communication condition A2 defines that some of a plurality of types of pieces of state information D1 to D3 (pieces of state information D2 and D3) about the individual air conditioners 10 are not transmitted. The second communication condition A2 defines that the transmission frequency of the pieces of state information D1 to D3 about the individual air conditioners 10 is lower than in the first communication condition A1. The second communication condition A2 is a communication condition for reducing the amount of communication between the management apparatus 30 and the control terminal 20 as compared with the first communication condition A1.

The third communication condition A3 in FIG. 4 defines that the first state information D1, the second state information D2, and the third state information D3 are transmitted to the management apparatus 30 at a frequency of once per three minutes regarding the air conditioner 10 that is within a predetermined time after activation (a predetermined time has not elapsed after activation), and that the first state information D1 and the second state information D2 are transmitted to the management apparatus 30 at a frequency of once per ten minutes regarding the air conditioner 10 that is out of the predetermined time after activation (the predetermined time has elapsed after activation) (part (c) of FIG. 4). The third communication condition A3 defines that some of the plurality of types of pieces of state information D1 to D3 (pieces of state information D2 and D3) about some of the air conditioners 10 are not transmitted. The third communication condition A3 defines that the transmission frequency of the state information about some of the air conditioners 10 (10b, 10c) is lower than that of the state information about the other air conditioner 10 (10a). The third communication condition A3 is a communication condition for reducing the amount of communication between the management apparatus 30 and the control terminal 20 as compared with the first communication condition A1.

The communication conditions also define conditions related to various types of communication other than the above. For example, the communication conditions stored in the storage unit 21 can be updated as appropriate from the management apparatus 30 or another terminal. For example, the communication conditions stored in the storage unit 21 are updated in response to an instruction from the management apparatus 30.

The communication unit 22 communicates with an external network including the communication network NW1. With the function of the communication unit 22, transmission and reception of various commands and various pieces of data are performed between the control terminal 20 and the management apparatus 30.

The processing unit 23 executes various information processing operations. The processing unit 23 acquires state information as appropriate from the corresponding air conditioner 10 via the connection unit 24. The processing unit 23 controls communication between the control terminal 20 and the management apparatus 30 via the communication unit 22. For example, the processing unit 23 transmits device information (state information) acquired by the control terminal 20 from the outdoor unit 11 connected thereto, to the management apparatus 30 in accordance with a communication condition. The control terminal 20 including the above-described processing unit 23 corresponds to a "device information transmitting apparatus" that transmits device information about a predetermined device to the management apparatus 30. The processing unit 23 suppresses communication of one or some of a plurality of pieces of device information (state information) in response to receipt of, from the management apparatus 30, a reduction control notification as device information (control information). At this time, the processing unit 23 updates the content of the communication conditions stored in the storage unit 21 in response to a request from the management apparatus 30 included in the reduction control notification.

The connection unit 24 is connected to the connection unit 11Y of the outdoor unit 11. The control terminal 20 is capable of transmitting instruction information to the outdoor unit control circuit 11X and acquiring state information from the outdoor unit control circuit 11X, via the connection unit 24.

(3-2) Management Apparatus

The management apparatus 30 connects to each of the control terminal 20 and the monitoring terminal 40 via the communication network NW1 and manages operation states and so forth of a plurality of air conditioners 10 including air conditioners 10a to 10i. The management apparatus 30 communicates with the control terminal 20 via the communication network NW1. As illustrated in FIG. 3, the management apparatus 30 includes a storage unit 31, an input unit 32, a communication unit 33, a processing unit 34, and an output unit 35.

The storage unit 31 stores various pieces of information and includes a read only memory (ROM), a random access memory (RAM), and/or a hard disk or the like. Here, the storage unit 31 includes a centralized management storage unit 31A, a state information storage unit 31B, a control information storage unit 31C, and a communication condition storage unit 31D. The storage unit 31 stores a program for executing various functions of the management apparatus 30.

The centralized management storage unit 31A stores information about the plurality of air conditioners 10a to 10i managed by the management apparatus 30. For example, the centralized management storage unit 31A individually stores information about the facility 2 in which the individual air conditioners 10a to 10i are installed, information about the outdoor unit 11 and the installation spaces 5a to 5d of the indoor units 12a to 12d in the facility 2, information about a monitor of the individual air conditioners 10, the individual air conditioners 10 corresponding to each control terminal 20, and so forth.

The state information storage unit 31B individually stores various pieces of state information received from the control terminal 20 in association with the individual air conditioners 10a to 10i.

The control information storage unit 31C individually stores control information for the individual air conditioners 10a to 10i input by a manager who operates the management apparatus 30, control information corresponding to a request from the monitoring terminal 40 described below to the individual air conditioners 10a to 10i, and so forth.

The communication condition storage unit 31D individually stores "communication conditions" about the individual control terminals 20. The information stored in the communication condition storage unit 31D includes the information of the communication conditions stored in the storage unit 21 of each control terminal 20 (the information illustrated in FIG. 4). The communication conditions for the individual control terminals 20 can be changed by appropriately rewriting the information stored in the communication condition storage unit 31D of the management apparatus 30.

The storage unit 31 is capable of storing any information other than the above-described various storage units.

The input unit 32 is an interface for inputting information to the management apparatus 30. For example, the input unit 32 is implemented by a keyboard, a mouse, and/or a touch screen or the like. For example, the input unit 32 enables information to be input to various reception screens. Thus, a manager is able to input control information for each air conditioner 10 and input information for changing various settings, via the input unit 32. For example, the manager is able to set a reference value SV (described below) for reduction control described below, via the input unit 32. For example, the manager is able to input a command of canceling reduction control, via the input unit 32.

The communication unit 33 is an interface for communicating with the control terminal 20 and the monitoring terminal 40. Specifically, the communication unit 33 receives state information from the control terminal 20. For example, the communication unit 33 transmits control information to the control terminal 20. For example, the communication unit 33 receives a "request" or other information from the monitoring terminal 40. For example, the communication unit 33 transmits a reduction control notification or a cancellation notification described below to the monitoring terminal 40 or the control terminal 20 in accordance with a process by the processing unit 34. For example, the communication unit 33 receives a request about the reference value SV for reduction control from another information processing apparatus, such as the monitoring terminal 40. The device information and other information received by the communication unit 33 are stored in the storage unit 31.

The processing unit 34 executes various information processing operations in the management apparatus 30 and is constituted by a central processing unit (CPU), a cache memory, and so forth. Here, the processing unit 34 has functions of a calculation unit 341, a communication quality measuring unit 342, a communication quality determining unit 343, and a reduction control unit 344.

The calculation unit 341 executes calculation regarding information processing that is based on information received by the communication unit 33. For example, the calculation unit 341 generates various pieces of management information or the like in accordance with state information received from the control terminal 20. The calculation unit 341 executes processing in response to a request from the monitoring terminal 40 and generates monitoring information or the like indicating a result of the processing.

The communication quality measuring unit 342 ("first measuring unit") measures a parameter related to the communication quality of communication between the management apparatus 30 and the control terminal 20 via the communication network NW1. Specifically, the communication quality measuring unit 342 measures any one of or any combination of parameters such as a communication speed, a packet loss rate, the number of retransmissions, and a delay time.

The communication quality determining unit 343 ("first determining unit") determines, on the basis of the parameter related to the communication quality and measured by the communication quality measuring unit 342, whether the communication quality of communication between the management apparatus 30 and the control terminal 20 via the communication network NW1 has decreased and/or the degree of decrease (communication quality determination). Specifically, the communication quality determining unit 343 determines, in the communication quality determination, whether the communication quality has decreased and/or the degree of decrease of that, on the basis of whether the parameter measured by the communication quality measuring unit 342 is more than or equal to a predetermined reference value SV or less than the predetermined reference value SV. For example, the communication quality determining unit 343 determines, in the communication quality determination, whether the communication quality has decreased and/or the degree of decrease, on the basis of a communication speed during a predetermined period being less than the predetermined reference value SV. For example, the communication quality determining unit 343 determines, in the communication quality determination, whether the communication quality has decreased and/or the degree of decrease, on the basis of a packet loss rate, the number of retransmissions, and/or a delay time being more than or equal to the predetermined reference value SV. A determination result of the communication quality determination is transmitted to the reduction control unit 344.

The reference value SV used for the communication quality determination is individually determined for each parameter on the basis of the state during a predetermined period, as a value that is assumed in a case where the communication state in the communication network NW1 is normal. In other words, the reference value SV is set by monitoring the communication quality in the communication network NW1 for the predetermined period. For example, the reference value SV related to a communication speed is determined on the basis of the state of a communication speed during a predetermined period (for example, one hour) before communication quality determination. For example, the reference value SV related to a packet loss rate is determined on the basis of the state of a packet loss rate during a predetermined period (for example, one day) before communication quality determination. For example, the reference value SV related to the number of retransmissions is determined on the basis of the state of the number of retransmissions during a predetermined period (for example, three hours) before communication quality determination. For example, the reference value SV related to a delay time is determined on the basis of the state of a delay time during a predetermined period (for example, 30 minutes) before communication quality determination. The above-described predetermined period is appropriately set based on a situation, in accordance with design specifications, an installation environment, or the like.

The reduction control unit 344 ("first control unit") executes "reduction control ("first control")" of reducing the amount of communication between the management apparatus 30 and the control terminal 20 if it is determined in communication quality determination that communication quality has decreased or that the degree of decrease is high. Reduction control is changing of communication conditions for individual pieces of information transmitted between the management apparatus 30 and the control terminal 20, and is control of reducing the amount of communication. Specifically, reduction control is executed by changing the communication condition between the management apparatus 30 and the control terminal 20. A plurality of types of state information (device information) related to the plurality of air conditioners 10a to 10i are transmitted between the management apparatus 30 and the individual control terminals 20*a* to 20*c*. The reduction control unit 344 suppresses communication of a part of the plurality of types of state information, thereby executing reduction control. The reduction control unit 344 appropriately changes the communication condition in accordance with a situation in which communication quality decreases, the degree of decrease in communication quality, or the like. Every time the reduction control unit 344 changes the communication condition in reduction control, the reduction control unit 344 selects an existing communication condition or generates a new communication condition.

In reduction control, the reduction control unit 344 appropriately changes the communication condition in accordance with the degree of priority of each piece of information transmitted to or received from the control terminal 20. The degree of priority of each piece of information is individually determined in accordance with the degree of importance of the piece of information. For example, the degree of priority of each piece of information is individually determined in accordance with the degree of necessity of the piece of information in operating the system including the management apparatus 30 and the control terminal 20. For example, the degree of priority of each piece of information is individually determined in accordance with the device that transmits the piece of information, the device related to the piece of information, or an environmental condition related to the device (the type, place of disposition, ability, or the like of the device). For example, the degree of priority is determined on the basis of at least one of the installation status, usage status, attribute, and monitoring purpose of the air conditioner 10 corresponding to the device information. The "monitoring purpose" herein includes whether there is a monitoring purpose and/or the details of the monitoring purpose.

For example, the degree of priority is determined on the basis of at least one of the pieces of information illustrated in FIG. 5, for example. FIG. 5 illustrates that the degree of priority is determined on the basis of an aspect of "air conditioning entity", "air conditioning environment", or "time".

FIG. 5 illustrates that examples of "air conditioning entity" include "type", "state", and "instruction" of "air conditioner". For example, "type" of "air conditioner" includes "room air conditioner" and "multi-air conditioner for building". For example, "state" of "air conditioner" includes "right after activation", "thermo-ON/OFF", "abnormal", "1 week after test run", and "right after human operation". For example, "instruction" of "air conditioner" includes "collective operation", "number of operations", frequency of operation", "details of operation", and "operation history" as "manual instruction", and includes "temperature control application" as "auto instruction".

FIG. 5 illustrates that examples of "air conditioning environment" include "target space of air conditioning", "target person of air conditioning", and "target item of air conditioning". For example, "target space of air conditioning" includes "type (president room, server room, corridor, etc.)", "installation environment (perimeter, interior, etc.)", "state (door, opened/closed window, illuminance, etc.)", and "external factor (weather, meteorological disaster, etc.)". For example, "target person of air conditioning" includes "presence (presence information, history of presence information, human detection sensor, operation schedule, stay time, etc.)", "state (amount of activity, biological information, degree of comfort, etc.)", "intention (instruction based on intention, etc.)", and "attribute (age, sex, post, role (manager, user), etc.)". For example, "target item of air conditioning" includes "presence (presence information)", "state (state of fruit, etc.)", and "service (alive monitoring, energy saving control, control related to fee of demand control or the like, etc.)". In other words, the content of "service" corresponds to "monitoring purpose".

FIG. 5 illustrates that examples of "time" include "time section", "business hours", and "demand response". For example, "time section" includes "morning", "daytime", "evening", and "night". For example, "business hours" includes "within on-duty hours", "overtime hours", and "nighttime". For example, "demand response" includes "at start", "before end", and "nighttime".

The degree of priority is determined, for example, in the manners illustrated in FIG. 6 to FIG. 9.

FIG. 6 schematically illustrates, as an example, a manner of determining the degree of priority in accordance with time series during demand control. FIG. 6 illustrates that the degree of priority of information is low regarding a power suppression instruction for the air conditioner 10 (device) during the former 15 minutes of demand control (15 minutes after start of demand control). FIG. 6 illustrates that the degree of priority of information is high regarding a power suppression instruction for the air conditioner 10 during the latter 15 minutes of demand control (15 minutes before end of demand control). Referring to FIG. 6, in demand control, the degree of priority of information is set to high regarding a power suppression instruction for the latter 15 minutes during which more severe control is required for a target power than during the former 15 minutes.

FIG. 7 schematically illustrates, as an example, a manner of determining the degree of priority in accordance with a usage status of a target person of air conditioning. FIG. 7 illustrates a state in which the degree of priority of data is changed in accordance with an operation side of air conditioning. FIG. 7 illustrates that the degree of priority of information transmitted from the management apparatus 30 to the control terminal 20 is high and the degree of priority of information transmitted from the control terminal 20 to the management apparatus 30 is low, during an operation from the communication network NW1 side (during an operation from a device connected to the communication network NW1 with respect to a local side on which a device is disposed). FIG. 7 illustrates that the degree of priority of information transmitted from the management apparatus 30 to the control terminal 20 is low and the degree of priority of information transmitted from the control terminal 20 to the management apparatus 30 is high, during an operation from the local side (during an operation from the control terminal 20 or the like disposed on the local side).

FIG. 8 schematically illustrates, as an example, a manner of determining the degree of priority in accordance with the degree of comfort of a target person of air conditioning FIG. 8 illustrates a state in which the degree of priority of data is changed in accordance with the degree of comfort of a target person of air conditioning. FIG. 8 illustrates that the degree of priority of information transmitted regarding biological information is high and the degree of priority of information transmitted regarding a current state is low, in a case where the degree of comfort is assumed to be high. FIG. 8 illustrates that the degree of priority of information transmitted regarding biological information is low and the degree of priority of information transmitted regarding a current state is high, in a case where the degree of comfort is assumed to be low.

FIG. 9 schematically illustrates, as an example, a manner of determining the degree of priority in accordance with the presence or absence of a user of air conditioning FIG. 9 illustrates that the degree of priority of information transmitted regarding a current state is high in a case where a user of air conditioning is present. FIG. 9 illustrates that the degree of priority of information transmitted regarding a current state is low in a case where a user of air conditioning is absent.

After executing reduction control, the reduction control unit 344 cancels (suspends or stops) execution of the reduction control if it is determined that a decrease in communication quality has been overcome or that the degree of decrease has reduced at a predetermined ratio. In the case of executing reduction control, the reduction control unit 344 transmits a "reduction control notification" indicating that reduction control is to be executed to the corresponding control terminal 20 and monitoring terminal 40 via the communication unit 33. In the reduction control notification to be transmitted to the control terminal 20, the reduction control unit 344 includes information designating the details of the communication condition to which the communication condition is to be changed in accordance with reduction control. In other words, the reduction control unit 344 transmits, in reduction control, a request for changing the communication condition to the designated condition to the corresponding control terminal 20. In the case of canceling reduction control, the reduction control unit 344 transmits a "cancellation notification" indicating that reduction control is to be canceled to the corresponding control terminal 20 and monitoring terminal 40 via the communication unit 33.

The output unit 35 outputs various pieces of information and is constituted by a display, a speaker, and the like of various types. For example, the output unit 35 outputs an input screen or the like for receiving input of the reference value SV for reduction control. The various pieces of information output by the output unit 35 can be output to the monitoring terminal 40 and the maintenance terminal 50 via the communication network NW1. For example, an anomaly notice output by the output unit 35 is also output to the maintenance terminal 50 registered in advance.

(3-3) Monitoring Terminal

The monitoring terminal 40 is associated with any one of the control terminals 20, and transmits various requests related to the air conditioners 10 (devices) belonging to the control terminal 20 to the management apparatus 30. In other words, a monitor who operates a control terminal 20 is associated with any one of the control terminals 20, and transmits various requests related to the air conditioners 10 belonging to the control terminal 20 to the management apparatus 30. The monitoring terminal 40 (monitor) may be associated with the control terminal 20 in a one-to-one relationship, a one-to-many relationship, or a many-to-many relationship. The monitoring terminal 40 monitors the state of the air conditioner 10 on the basis of monitoring information received from the management apparatus 30. The monitoring terminal 40 is operated by, for example, a monitor given the right to execute various control operations on the air conditioner 10.

The monitoring terminal 40 includes a communication unit 41, an input unit 42, a processing unit 43, and an output unit 44.

The communication unit 41 connects to the management apparatus 30 via the communication network NW1 and transmits a request or command for the air conditioner 10 to the management apparatus 30. The communication unit 41 receives various pieces of information from the management apparatus 30 and other devices.

The input unit 42 receives a request to be transmitted to the management apparatus 30. For example, the monitor is able to input, via the input unit 42, a command of canceling the execution of reduction control to be transmitted to the management apparatus 30. For example, the manager is able to set the reference value SV for reduction control via the input unit 32.

The processing unit 43 executes various information processing operations in the monitoring terminal 40.

The output unit 44 outputs information on the basis of various pieces of information received from the management apparatus 30. For example, the output unit 44 outputs information indicating that reduction control is being executed, in response to receipt of a reduction control notification by the communication unit 41.

With the above-described configuration, the monitoring terminal 40 is capable of transmitting requests for executing various operations, such as a heating operation and a cooling operation, to the air conditioner 10. The monitoring terminal 40 is capable of responding, via the communication unit 41, to various inquiries from the management apparatus 30. The monitoring terminal 40 is capable of outputting various pieces of information to the monitor.

The monitor corresponds to an owner of the facility 2, a manager of the facility 2, a user of the facility 2, a manufacturer of the air conditioner 10, a seller of the air conditioner 10, or the like. The monitor is given a right that varies according to the type of the monitor. Thus, the type of request that can be input to the air conditioner 10 varies according to the level of the right given to each monitoring terminal 40. A plurality of items of device information include an item whose communication interval is allowed to be changed and an item whose communication interval is not allowed to be changed in accordance with the level of the right of the monitoring terminal 40. Setting information of the level of the right is stored in the centralized management storage unit 31A of the management apparatus 30.

(3-4) Maintenance Terminal

The maintenance terminal 50 is a terminal operated by a maintenance worker of the air conditioner 10. The maintenance terminal 50 receives an anomaly notice from the management apparatus 30. Accordingly, the maintenance worker becomes able to diagnose an anomaly, cope with a failure, or the like of the air conditioner 10 in which an anomaly notice has been detected.

(4) REDUCTION CONTROL IN DEVICE MANAGEMENT SYSTEM 1

Figure 10:
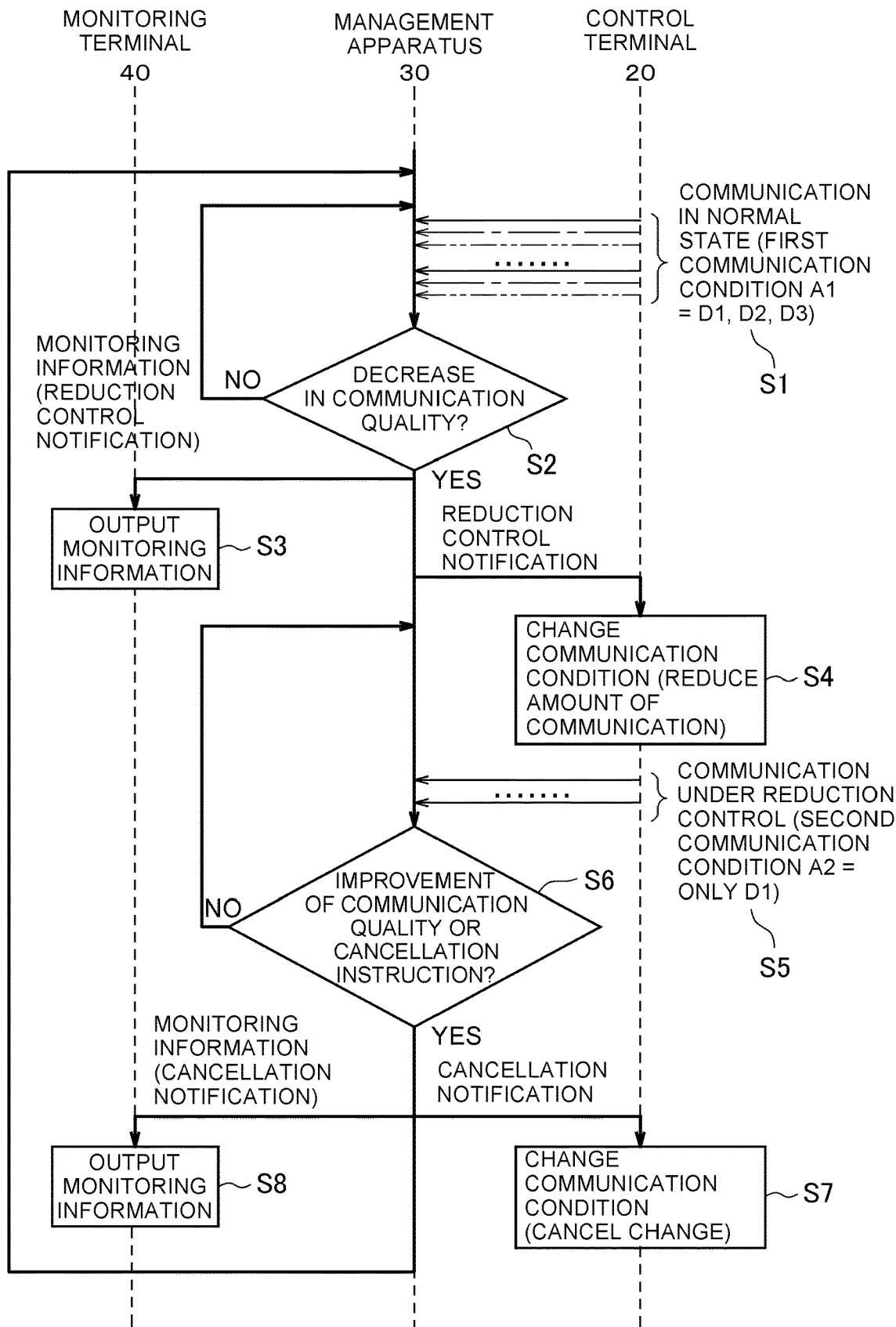
FIG. 10 is a schematic diagram for describing an example of reduction control executed in the device management system according to the first embodiment.

FIG. 10 is a schematic diagram for describing an example of reduction control executed in the device management system 1 according to the present embodiment. FIG. 10 illustrates a flowchart of a process in the relationship between a single management apparatus 30, a single control terminal 20, and a single monitoring terminal 40. However, the process illustrated in FIG. 10 is individually performed between the management apparatus 30, and each control terminal 20 and/or each monitoring terminal 40.

In a "normal state" in which the degree of decrease in communication quality is not high, the management apparatus 30 and the control terminal 20 execute communication of a plurality of types of device information under a predetermined communication condition. For example, in the normal state, the control terminal 20a transmits the first state information D1, the second state information D2, and the third state information D3 about the air conditioner 10a to the management apparatus 30 under the first communication condition A1 (S1). The management apparatus 30 receives, via the input unit 32 and the communication unit 33, a predetermined reference value SV about communication quality (here, any one of or any combination of parameters such as a communication speed, a packet loss rate, the number of retransmissions, and a delay time).

In the management apparatus 30, whether the communication quality has decreased, and the degree of decrease are determined as necessary (S2). Specifically, the communication quality determining unit 343 determines, as necessary, whether the parameter measured by the communication quality measuring unit 342 is more than or equal to the predetermined reference value SV or less than the predetermined reference value SV.

If the communication quality determining unit 343 determines that the parameter measured by the communication quality measuring unit 342 is more than or equal to the predetermined reference value SV or less than the predetermined reference value SV, which is a state in which a decrease in communication quality is assumed, the reduction control unit 344 of the management apparatus 30 determines to execute reduction control (S2—Yes). In other words, the management apparatus 30 executes reduction control in accordance with the degree of decrease in communication quality. On the other hand, if the communication quality determining unit 343 does not determine that the parameter is more than or equal to the predetermined reference value SV or less than the predetermined reference value SV, which is a state in which a decrease in communication quality is assumed, the communication between the control terminal 20 and the management apparatus 30 is continued under the first communication condition A1 in the normal state (S2-No, S1).

In a case where reduction control is to be executed, the management apparatus 30 transmits monitoring information including a reduction control notification to the monitoring terminal 40 (S3). Accordingly, a monitor or the like using the monitoring terminal 40 is able to recognize the execution of reduction control.

In a case where reduction control is to be executed, a "reduction control notification" indicating that reduction control is to be executed is transmitted from the management apparatus 30 to the control terminal 20. In response to receipt of the reduction control notification, the control terminal 20 changes the communication condition of communication between the control terminal 20 and the management apparatus 30 (S4). For example, in the example illustrated in FIG. 10, the communication condition of communication between the control terminal 20 and the management apparatus 30 is changed from the first communication condition A1 to the second communication condition A2. Accordingly, the control terminal 20 transmits only the first state information D1 to the management apparatus 30 at a greater communication interval or the like, and stops transmitting the second state information D2 and the third state information D3 (S5). Although not illustrated, the amount of communication of information transmitted from the management apparatus 30 to the control terminal 20 is reduced in accordance with the changed communication condition. Thus, the amount of communication between the control terminal 20 and the management apparatus 30 is reduced, and thus the communication quality of communication between the management apparatus 30 and the control terminal 20 via the communication network NW1 is improved.

After that, the communication quality determining unit 343 of the management apparatus 30 determines, as necessary, whether the parameter related to the communication quality is less than the predetermined reference value SV or more than or equal to the predetermined reference value SV, which is a state in which improvement of the communication quality is assumed, or whether a command of providing an instruction to cancel the reduction control has been input (S6). If it is not determined that the parameter related to the communication quality is less than the predetermined reference value SV or more than or equal to the predetermined reference value SV, which is a state in which improvement of the communication quality is assumed, and while a command of providing an instruction to cancel the reduction control has not been input, communication is continued under the suppressed communication condition (S6—No, S5). On the other hand, if the communication quality determining unit 343 of the management apparatus 30 determines that the parameter related to the communication quality is less than the predetermined reference value SV or more than or equal to the predetermined reference value SV, which is a state in which improvement of the communication quality is assumed, or if a command of providing an instruction to cancel the reduction control has been input, the reduction control unit 344 determines to cancel the reduction control (S6—Yes). For example, in the example illustrated in FIG. 10, it is determined to restore the communication condition between the control terminal 20a and the management apparatus 30 from the second communication condition A2 to the first communication condition A1. Subsequently, a "cancellation notification" indicating that the reduction control has been canceled is transmitted from the management apparatus 30 to the control terminal 20.

In response to receipt of the cancellation notification, the control terminal 20 restores the communication condition between the control terminal 20 and the management apparatus 30 to the normal state (S7).

In response to the determination that the reduction control is to be canceled, monitoring information including a cancellation notification is transmitted from the management apparatus 30 to the monitoring terminal 40 (S8). Accordingly, the monitor or the like operating the monitoring terminal 40 is able to recognize that the reduction control has been canceled.

The above-described series of steps are executed until a reduction control termination instruction is input. The reduction control termination instruction is input via the input unit 32 of the management apparatus 30, the input unit 42 of the monitoring terminal 40, and the like.

(5) FEATURES (5-1)

In the present embodiment, the management apparatus 30 communicates with the control terminal 20, which is an apparatus that transmits device information, via the communication network NW1 under a predetermined communication condition, and includes the communication quality measuring unit 342 that measures communication quality in the communication network NW1, the communication quality determining unit 343 that determines the degree of decrease in the communication quality, and the reduction control unit 344 that executes reduction control in accordance with the degree of decrease in the communication quality. In the reduction control, the reduction control unit 344 changes the communication condition in accordance with the degree of priority of each of pieces of information transmitted between the control terminal 20 and the management apparatus 30. Accordingly, the amount of communication decreases.

Accordingly, even in a case where the communication quality in the communication network NW1 decreases in the communication between the management apparatus 30 and the control terminal 20 via the communication network NW1, necessary information (high priority information) can be transmitted and received.

(5-2)

In the present embodiment, in the reduction control, the reduction control unit 344 changes the communication condition regarding transmission of information from the management apparatus 30 to the control terminal 20. Accordingly, in a case where the communication quality in the communication network NW1 decreases in the communication between the management apparatus 30 and the control terminal 20 via the communication network NW1, the communication condition is changed regarding transmission of information from the management apparatus 30 to the control terminal 20.

(5-3)

In the present embodiment, in the reduction control, the reduction control unit 344 transmits, to the control terminal 20, an instruction to change the communication condition (reduction control notification) regarding transmission of information from the control terminal 20 to the management apparatus 30. Accordingly, in a case where the communication quality in the communication network NW1 decreases in the communication between the management apparatus 30 and the control terminal 20 via the communication network NW1, the communication condition is changed regarding transmission of information from the control terminal 20 to the management apparatus 30.

(5-4)

In the present embodiment, the device information transmitted by the control terminal 20 is about the air conditioner 10, and the degree of priority is determined based on at least one of an installation status of the air conditioner 10, a usage status of the air conditioner 10, an attribute of the air conditioner 10, and a monitoring purpose of the air conditioner 10. Accordingly, in a case where the communication quality in the communication network NW1 decreases in the communication between the management apparatus 30 and the control terminal 20 in the system that manages the air conditioner 10 via the communication network NW1, the communication condition can be finely determined.

(5-5)

In the present embodiment, the processing unit 34 and the communication unit 33 (first notifying unit) of the management apparatus 30 notifies a predetermined monitoring terminal 40 that the reduction control is being executed, when the reduction control unit 344 executes the reduction control. Accordingly, a monitor (user or system operator) is able to grasp that the reduction control is being executed.

(5-6)

In the present embodiment, the reduction control unit 344 cancels the reduction control in response to receipt of, from another apparatus such as the monitoring terminal 40, a command of canceling (suspending or stopping) execution of the reduction control. Accordingly, it is possible to determine execution and cancellation of the reduction control as appropriate.

(5-7)

In the present embodiment, the communication quality determining unit 343 determines the communication quality, based on the reference value SV of the communication quality, the reference value SV being determined based on a result of measurement of the communication quality during a predetermined period. Accordingly, it is possible to accurately determine the degree of decrease in the communication quality.

(5-8)

In the present embodiment, the reference value SV for the reduction control can be determined by another information processing apparatus such as the monitoring terminal 40. Accordingly, it is possible to appropriately set a trigger for the reduction control.

(6) MODIFICATION EXAMPLES

The details according to the first embodiment can be modified as appropriate as illustrated in the following modification examples. Each modification example may be applied in combination with another modification example within the range in which no contradiction occurs.

(6-1) Modification Example 1A

The reference value SV of reduction control may be set mainly by the monitoring terminal 40. With this configuration, it is possible to provide the device management system 1 that reflects the intention of a monitor or the like who operates the monitoring terminal 40. For example, in a case where a communication fee is charged in accordance with the amount of communication in the device management system 1, the monitor or the like who operates the monitoring terminal 40 is able to set the amount of communication suitable for his/her needs. Accordingly, it is possible to reduce a communication fee of the monitor or the like who operates the monitoring terminal 40.

(6-2) Modification Example 1B

The device management system 1 according to the present embodiment may have a configuration of obtaining consent of a monitor or the like who operates the monitoring terminal 40 at the time of executing reduction control. Specifically, regarding determination of execution of reduction control, the monitor may be caused to select whether to consent to execution of reduction control in response to receipt of a reduction control notification in the monitoring terminal 40. In a case where consenting to execution of reduction control is selected in the monitoring terminal 40, a "consent notification" indicating consenting to execution of reduction control may be transmitted from the monitoring terminal 40 to the management apparatus 30, and the management apparatus 30 may determine to execute reduction control in response to receipt of the consent notification from the monitoring terminal 40. In a case where a consent notification is not received from the monitoring terminal 40 within a predetermined time, the management apparatus 30 may determine not to execute reduction control.

In this case, reduction control is executed when a consent notification is received from the monitoring terminal 40 in response to transmission of a reduction control notification. Thus, it is possible to provide the device management system 1 that reflects the intention of the monitor or the like who operates the monitoring terminal 40.

(6-3) Modification Example 1C

In the description given above, reduction control is executed by changing the communication condition to suppress communication of some of a plurality of pieces of state information (device information) or change the frequency of communication. However, the reduction control according to the present embodiment is not limited to such control. The reduction control according to the present embodiment is implemented by certain control of suppressing or reducing a decrease in the communication quality of communication between the management apparatus 30 and the control terminal 20 via the communication network NW1.

(6-4) Modification Example 1D

In the device management system 1 according to the present embodiment, reduction control may have intensity that varies stepwise in accordance with the degree of decrease in communication quality. In the device management system 1, when it is assumed that there are 100 data items to be transmitted, the 100 items are transmitted when reduction control is not executed (is "unnecessary"). On the other hand, in the device management system 1, reduction control is executed such that 80 items are transmitted when the communication quality "slightly decreases", 50 items are transmitted when the communication quality "further decreases", and 20 items are transmitted when the communication quality "significantly decreases".

(6-5) Modification Example 1E

Any one of the communication quality measuring unit 342, the communication quality determining unit 343, and the reduction control unit 344 in the processing unit 34 of the management apparatus 30 may be included in another apparatus as long as a processing result is appropriately transmitted to the management apparatus 30. For example, any one of the communication quality measuring unit 342, the communication quality determining unit 343, and the reduction control unit 344 may be included in the monitoring terminal 40 as long as a processing result is appropriately transmitted to the management apparatus 30.

(6-6) Modification Example 1F

In the above-described embodiment, the device information is about the air conditioner 10. Alternatively, the device information may be about a device other than the air conditioner 10 (for example, a ventilation device, a humidity adjusting device, an air handling unit, a chiller unit, and/or another refrigeration device or the like).

(6-7) Modification Example 1G

In the above-described embodiment, the communication condition related to communication between the management apparatus 30 and the control terminal 20 is changed in reduction control. More specifically, in the reduction control according to the above-described embodiment, both the communication condition related to the information transmitted from the management apparatus 30 to the control terminal 20 and the communication condition related to the information transmitted from the control terminal 20 to the management apparatus 30 are changed. However, in the reduction control, only one of the communication condition related to the information transmitted from the management apparatus 30 to the control terminal 20 and the communication condition related to the information transmitted from the control terminal 20 to the management apparatus 30 may be changed.

(6-8) Modification Example 1H

The individual communication conditions illustrated in FIG. 4 are merely examples. The communication conditions may be changed as appropriate in accordance with design specifications or a usage environment. For example, the communication condition related to the information transmitted from the management apparatus 30 to the control terminal 20 may be changed as appropriate in accordance with the degree of priority.

(6-9) Modification Example 1I

The matters taken into account in determining the degree of priority illustrated in FIG. 5 are merely examples. The matters taken into account in determining the degree of priority may be changed as appropriate in accordance with design specifications or a usage environment.

(6-10) Modification Example 1J

The manners of determining the degree of priority illustrated in FIG. 6 to FIG. 9 are merely examples. The manner of determining the degree of priority may be changed as appropriate in accordance with design specifications or a usage environment.

(6-11) Modification Example 1K

The flowchart of the process illustrated in FIG. 10 is merely an example. The flowchart of the process executed by the management apparatus 30, the control terminal 20, and the monitoring terminal 40 may be changed as appropriate in accordance with design specifications or a usage environment.

(6-12) Modification Example 1L

The configuration of the device management system 1 illustrated in FIG. 1 can be changed as appropriate. For example, any one or all of the control terminals 20 may be built in the air conditioner 10. Specifically, any one or all of the control terminals 20 may be built in any one of the outdoor units 11. For example, any one or all of the control terminals 20 may be built in any one of the indoor units 12. A communication apparatus such as a router used by the control terminal 20 to access the communication network NW1 may be built in the air conditioner 10 together with the control terminal 20 or may be disposed independently. There may be both the air conditioner 10 that has the control terminal 20 built therein and the air conditioner 10 that does not has the control terminal 20.

Second Embodiment

Hereinafter, a device management system 1A according to a second embodiment of the present disclosure will be described. The following embodiment is a specific example, does not limit the technical scope, and can be appropriately changed without deviating from the gist. Differences from the device management system 1 according to the first embodiment will be mainly described. Hereinafter, the same parts as those of the device management system 1 will not be described in principle.

(1) DEVICE MANAGEMENT SYSTEM 1A

Figure 11:
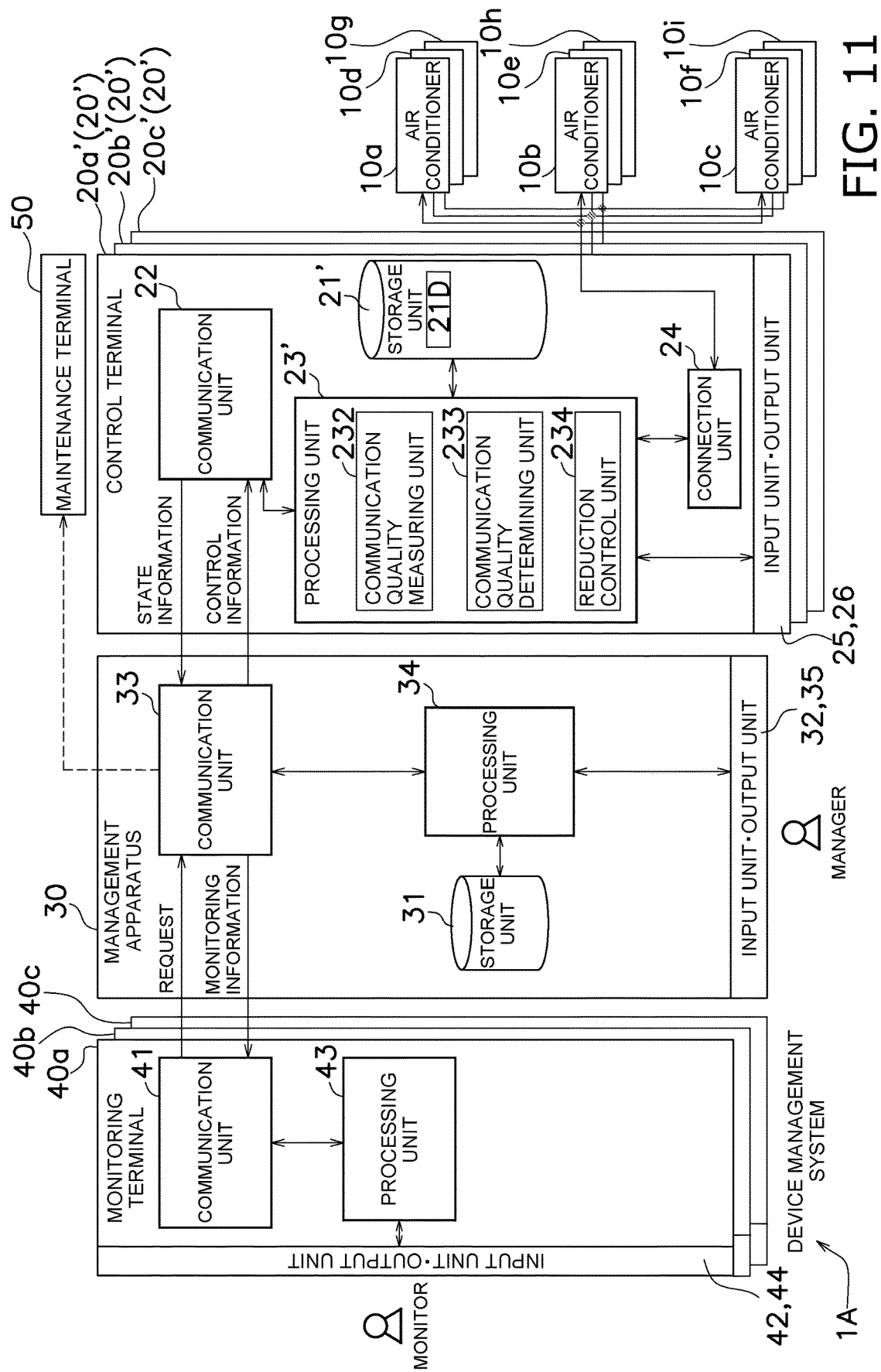
FIG. 11 is a schematic diagram illustrating functional blocks of individual apparatuses constituting a device management system according to a second embodiment.

FIG. 11 is a schematic diagram illustrating functional blocks of the individual apparatuses constituting the device management system 1A according to the present embodiment.

In the device management system 1A, the control terminals 20 are replaced with control terminals 20'. Each control terminal 20' includes a storage unit 21' instead of the storage unit 21, and a processing unit 23' instead of the processing unit 23. The control terminal 20' includes an input unit 25 and an output unit 26.

The storage unit 21' of the control terminal 20' includes, in addition to the storage region included in the storage unit 21, a communication condition storage unit 21D corresponding to the communication condition storage unit 31D in the management apparatus 30.

The processing unit 23' of the control terminal 20' includes a communication quality measuring unit 232, a communication quality determining unit 233, and a reduction control unit 234 corresponding to the communication quality measuring unit 342, the communication quality determining unit 343, and the reduction control unit 344 in the first embodiment, respectively.

The communication quality measuring unit 232 ("second measuring unit") measures a parameter related to the communication quality of communication between the management apparatus 30 and the control terminal 20 via the communication network NW1. Specifically, the communication quality measuring unit 232 measures any one of or any combination of parameters such as a communication speed, a packet loss rate, the number of retransmissions, and a delay time, like the communication quality measuring unit 342 of the management apparatus.

The communication quality determining unit 233 ("second determining unit") determines, on the basis of the parameter related to the communication quality and measured by the communication quality measuring unit 232, whether the communication quality of communication between the management apparatus 30 and the control terminal 20 via the communication network NW1 has decreased and/or the degree of decrease (communication quality determination). Specifically, the communication quality determining unit 233 determines, in the communication quality determination, whether the communication quality has decreased and/or the degree of decrease, on the basis of whether the parameter measured by the communication quality measuring unit 232 is more than or equal to a predetermined reference value SV or less than the predetermined reference value SV, like the communication quality determining unit 343. For example, the communication quality determining unit 233 determines, in the communication quality determination, whether the communication quality has decreased and/or the degree of decrease, on the basis of a communication speed during a predetermined period being less than the predetermined reference value SV. For example, the communication quality determining unit 343 determines, in the communication quality determination, whether the communication quality has decreased and/or the degree of decrease, on the basis of a packet loss rate, the number of retransmissions, and/or a delay time being more than or equal to the predetermined reference value SV. The determination result of the communication quality determination is transmitted to the reduction control unit 234. The manner of determining the reference value SV to be used for communication quality determination, and the manner of inputting the reference value SV are similar to those in the first embodiment. A manager is able to set a reference value SV (described below) for reduction control described below, via the input unit 25. The manager is able to input a command of canceling reduction control, via the input unit 25.

The reduction control unit 234 ("second control unit") executes "reduction control ("second control")" of reducing the amount of communication between the management apparatus 30 and the control terminal 20 if it is determined in communication quality determination that communication quality has decreased or that the degree of decrease is high, like the reduction control unit 344. Here, reduction control is changing of communication conditions for individual pieces of information transmitted between the management apparatus 30 and the control terminal 20, and is control of reducing the amount of communication, as in the first embodiment. The reduction control unit 234 suppresses communication of a part of information, such as state information, transmitted to or received from the management apparatus 30, thereby executing reduction control. The reduction control unit 234 appropriately changes the communication condition in accordance with a situation in which communication quality decreases, the degree of decrease in communication quality, or the like. Every time the reduction control unit 234 changes the communication condition in reduction control, the reduction control unit 234 selects an existing communication condition or generates a new communication condition.

In reduction control, the reduction control unit 234 changes the communication condition in accordance with the degree of priority of each piece of information transmitted to or received from the control terminal 20, like the reduction control unit 344 according to the first embodiment. The degree of priority of each piece of information is individually determined in accordance with the degree of importance of the piece of information.

After executing reduction control, the reduction control unit 234 cancels (suspends or stops) execution of the reduction control if it is determined that a decrease in communication quality has been overcome or that the degree of decrease has reduced at a predetermined ratio. In the case of executing reduction control, the reduction control unit 234 transmits a "reduction control notification" indicating that reduction control is to be executed to the corresponding management apparatus 30 and monitoring terminal 40 via the communication unit 22. The reduction control unit 234 includes, in the reduction control notification to be transmitted to the management apparatus 30, information designating the details of the communication condition to which the communication condition is to be changed in accordance with reduction control. In other words, the reduction control unit 234 transmits, in reduction control, a request for changing the communication condition to the designated condition to the management apparatus 30. In the case of canceling reduction control, the reduction control unit 234 transmits a "cancellation notification" indicating that reduction control is to be canceled to the management apparatus 30 and the monitoring terminal 40 via the communication unit 22.

Figure 12:
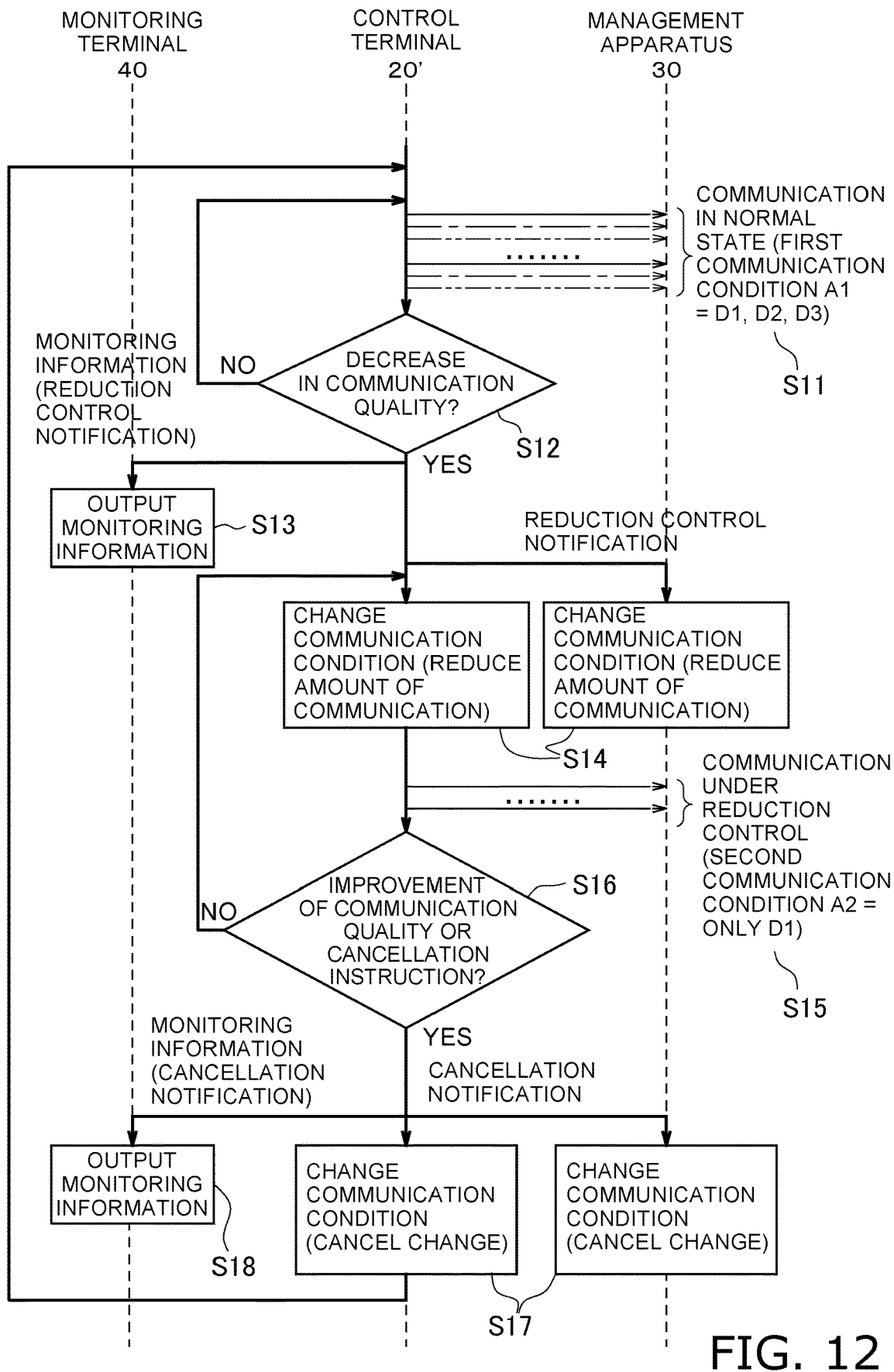
FIG. 12 is a schematic diagram for describing an example of reduction control executed in the device management system according to the second embodiment.

FIG. 12 is a schematic diagram for describing an example of reduction control executed in the device management system 1A according to the present embodiment. FIG. 12 illustrates a flowchart of a process in the relationship between a single management apparatus 30, a single control terminal 20', and a single monitoring terminal 40. However, the process illustrated in FIG. 12 is individually performed between the management apparatus 30, and each control terminal 20' and/or each monitoring terminal 40.

In a "normal state" in which the degree of decrease in communication quality is not high, the management apparatus 30 and the control terminal 20' execute communication of a plurality of types of device information under a predetermined communication condition. For example, in the normal state, the control terminal 20' transmits the first state information D1, the second state information D2, and the third state information D3 about the air conditioner 10a to the management apparatus 30 under the first communication condition A1 (S11). The control terminal 20' receives, via the input unit 25 and the communication unit 22, a predetermined reference value SV about communication quality (here, any one of or any combination of parameters such as a communication speed, a packet loss rate, the number of retransmissions, and a delay time).

In the control terminal 20', whether the communication quality has decreased, and the degree of decrease are determined as necessary (S12). Specifically, the communication quality determining unit 233 determines, as necessary, whether the parameter measured by the communication quality measuring unit 232 is more than or equal to the predetermined reference value SV or less than the predetermined reference value SV.

If the communication quality determining unit 233 determines that the parameter measured by the communication quality measuring unit 232 is more than or equal to the predetermined reference value SV or less than the predetermined reference value SV, which is a state in which a decrease in communication quality is assumed, the reduction control unit 234 of the management apparatus 30 determines to execute reduction control (S12—Yes). In other words, the control terminal 20' executes reduction control in accordance with the degree of decrease in communication quality. On the other hand, if the communication quality determining unit 233 does not determine that the parameter is more than or equal to the predetermined reference value SV or less than the predetermined reference value SV, which is a state in which a decrease in communication quality is assumed, the communication between the control terminal 20' and the management apparatus 30 is continued under the first communication condition A1 in the normal state (S12—No, S11).

In a case where reduction control is to be executed, the control terminal 20' transmits monitoring information including a reduction control notification to the monitoring terminal 40 (S13). Accordingly, a monitor or the like using the monitoring terminal 40 is able to recognize the execution of reduction control.

In a case where reduction control is to be executed, a reduction control notification indicating that reduction control is to be executed is transmitted from the control terminal 20' to the management apparatus 30. Subsequently, in the control terminal 20' and the management apparatus 30, the communication condition of communication between the control terminal 20' and the management apparatus 30 is changed (S14). For example, in the example illustrated in FIG. 12, the communication condition of communication between the control terminal 20' and the management apparatus 30 is changed from the first communication condition A1 to the second communication condition A2. Accordingly, the control terminal 20' transmits only the first state information D1 to the management apparatus 30 at a greater communication interval or the like, and stops transmitting the second state information D2 and the third state information D3 (S15). Although not illustrated, the amount of communication of information transmitted from the management apparatus 30 to the control terminal 20' is reduced in accordance with the changed communication condition. Thus, the amount of communication between the control terminal 20' and the management apparatus 30 is reduced, and thus the communication quality of communication between the management apparatus 30 and the control terminal 20' via the communication network NW1 is improved.

After that, the communication quality determining unit 233 of the control terminal 20' determines, as necessary, whether the parameter related to the communication quality is less than the predetermined reference value SV or more than or equal to the predetermined reference value SV, which is a state in which improvement of the communication quality is assumed, or whether a command of providing an instruction to cancel the reduction control has been input (S16). If it is not determined that the parameter related to the communication quality is less than the predetermined reference value SV or more than or equal to the predetermined reference value SV, which is a state in which improvement of the communication quality is assumed, and while a command of providing an instruction to cancel the reduction control has not been input, communication is continued under the suppressed communication condition (S16—No, S15). On the other hand, if the communication quality determining unit 233 of the control terminal 20' determines that the parameter related to the communication quality is less than the predetermined reference value SV or more than or equal to the predetermined reference value SV, which is a state in which improvement of the communication quality is assumed, or if a command of providing an instruction to cancel the reduction control has been input, the reduction control unit 344 determines to cancel the reduction control (S16—Yes). For example, in the example illustrated in FIG. 10, it is determined to restore the communication condition between the control terminal 20' and the management apparatus 30 from the second communication condition A2 to the first communication condition A1. Subsequently, a cancellation notification indicating that the reduction control has been canceled is transmitted from the management apparatus 30 to the control terminal 20'.

Subsequently, in the control terminal 20' and the management apparatus 30, the communication condition between the control terminal 20' and the management apparatus 30 is restored to the normal state (S17).

In response to the determination that the reduction control is to be canceled, monitoring information including a cancellation notification is transmitted from the control terminal 20' or the management apparatus 30 to the monitoring terminal 40 (S18). Accordingly, the monitor or the like operating the monitoring terminal 40 is able to recognize that the reduction control has been canceled.

The above-described series of steps are executed until a reduction control termination instruction is input. The reduction control termination instruction is input via the input unit 25 of the control terminal 20', the input unit 32 of the management apparatus 30, the input unit 42 of the monitoring terminal 40, and the like.

(2) FEATURES (2-1)

In the present embodiment, the control terminal 20', which is an apparatus that transmits device information, communicates with the management apparatus 30 via the communication network NW1 under a predetermined communication condition, and includes the communication quality measuring unit 232 that measures communication quality in the communication network NW1, the communication quality determining unit 233 that determines the degree of decrease in the communication quality, and the reduction control unit 234 that executes reduction control in accordance with the degree of decrease in the communication quality. In the reduction control, the reduction control unit 234 changes the communication condition in accordance with the degree of priority of each of pieces of information transmitted between the control terminal 20' and the management apparatus 30. Accordingly, the amount of communication decreases.

Accordingly, even in a case where the communication quality in the communication network NW1 decreases in the communication between the management apparatus 30 and the control terminal 20' via the communication network NW1, necessary information (high priority information) can be transmitted and received.

(2-2)

In the present embodiment, in the reduction control, the reduction control unit 234 changes the communication condition regarding transmission of information from the management apparatus 30 to the control terminal 20'. Accordingly, in a case where the communication quality in the communication network NW1 decreases in the communication between the management apparatus 30 and the control terminal 20' via the communication network NW1, the communication condition is changed regarding transmission of information from the management apparatus 30 to the control terminal 20'.

(2-3)

In the present embodiment, in the reduction control, the reduction control unit 234 transmits, to the control terminal 20', an instruction to change the communication condition (reduction control notification) regarding transmission of information from the control terminal 20' to the management apparatus 30. Accordingly, in a case where the communication quality in the communication network NW1 decreases in the communication between the management apparatus 30 and the control terminal 20' via the communication network NW1, the communication condition is changed regarding transmission of information from the control terminal 20' to the management apparatus 30.

(2-4)

Also in the present embodiment, the device information transmitted by the control terminal 20' is about the air conditioner 10, and the degree of priority is determined based on at least one of an installation status of the air conditioner 10, a usage status of the air conditioner 10, an attribute of the air conditioner 10, and a monitoring purpose of the air conditioner 10. Accordingly, in a case where the communication quality in the communication network NW1 decreases in the communication between the management apparatus 30 and the control terminal 20' in the system that manages the air conditioner 10 via the communication network NW1, the communication condition can be finely determined.

(2-5)

In the present embodiment, the processing unit 23' and the communication unit 22 (second notifying unit) of the control terminal 20' notify a predetermined monitoring terminal 40 that the reduction control is being executed, when the reduction control unit 234 executes the reduction control. Accordingly, a monitor (user or system operator) is able to grasp that the reduction control is being executed.

(2-6)

In the present embodiment, the reduction control unit 234 cancels the reduction control in response to receipt of, from another apparatus such as the monitoring terminal 40, a command of canceling (suspending or stopping) execution of the reduction control. Accordingly, it is possible to determine execution and cancellation of the reduction control as appropriate.

(2-7)

In the present embodiment, the communication quality determining unit 233 determines the communication quality, based on the reference value SV of the communication quality, the reference value SV being determined based on a result of measurement of the communication quality during a predetermined period. Accordingly, it is possible to accurately determine the degree of decrease in the communication quality.

(2-8)

Also in the present embodiment, the reference value SV for the reduction control can be determined by another information processing apparatus such as the monitoring terminal 40. Accordingly, it is possible to appropriately set a trigger for the reduction control.

(3) MODIFICATION EXAMPLES

The details according to the second embodiment can be modified as appropriate as illustrated in the following modification examples. Each modification example may be applied in combination with another modification example within the range in which no contradiction occurs. The spirit implemented in the device management system 1 according to the first embodiment and the spirit according to the modification examples can also be applied to the device management system 1A according to the present embodiment within the range in which no contradiction occurs.

(3-1) Modification Example 2A

In the device management system 1A, any one or all of the communication quality measuring unit 342, the communication quality determining unit 343, and the reduction control unit 344 in the processing unit 34 of the management apparatus 30 may be omitted as appropriate.

(3-2) Modification Example 2B

In the device management system 1A, any one or all of the communication quality measuring unit 232, the communication quality determining unit 233, and the reduction control unit 234 in the processing unit 23' of the control terminal 20' may be disposed in another apparatus (for example, the management apparatus 30, the monitoring terminal 40, or the like).

(3-3) Modification Example 2C

The flowchart of the process illustrated in FIG. 12 is merely an example. The flowchart of the process executed by the management apparatus 30, the control terminal 20', and the monitoring terminal 40 may be changed as appropriate in accordance with design specifications or a usage environment.

(3-4) Modification Example 2D

In the above-described embodiment, the communication condition related to communication between the management apparatus 30 and the control terminal 20 is changed in reduction control. More specifically, in the reduction control according to the above-described embodiment, both the communication condition related to the information transmitted from the management apparatus 30 to the control terminal 20 and the communication condition related to the information transmitted from the control terminal 20 to the management apparatus 30 are changed. However, in the reduction control, only one of the communication condition related to the information transmitted from the management apparatus 30 to the control terminal 20 and the communication condition related to the information transmitted from the control terminal 20 to the management apparatus 30 may be changed.

APPENDIX

The embodiments have been described above. It is to be understood that the embodiments and the details can be variously changed without deviating from the gist and scope described in the claims.

REFERENCE SIGNS LIST 1, 1A: device management system
10: air conditioner (device)
11: outdoor unit
12: indoor unit
20, 20': control terminal (device information transmitting apparatus)
21: storage unit
21D: communication condition storage unit
22: communication unit (second notifying unit)
23: processing unit 232: communication quality measuring unit (second measuring unit)
233: communication quality determining unit (second determining unit)
234: reduction control unit (second control unit, second notifying unit)
30: management apparatus
31: storage unit
31D: communication condition storage unit
32: input unit
33: communication unit (first notifying unit)
34: processing unit
341: calculation unit
342: communication quality measuring unit (first measuring unit)
343: communication quality determining unit (first determining unit)
344: reduction control unit (first control unit, first notifying unit)
40: monitoring terminal (information processing apparatus, information output terminal, another apparatus)
50: maintenance terminal
NW1: communication network

CITATION LIST

Patent Literature

<PTL 1> Japanese Unexamined Patent Application Publication No. 2010-210209

What is claimed is:

1. A management apparatus that communicates with a device information transmitting apparatus via a communication network under a predetermined communication condition, the device information transmitting apparatus transmitting device information about a predetermined device, the management apparatus comprising:
a first measuring unit configured to measure communication quality in the communication network;
a first determining unit configured to determine a degree of decrease in the communication quality; and
a first control unit configured to execute a first control to reduce an amount of communication between the management apparatus and the device information transmitting apparatus in accordance with the degree of decrease in the communication quality,
in the first control, the first control unit being configured to change the communication condition in accordance with a degree of priority of each of a plurality of pieces of information transmitted between the device information transmitting apparatus and the management apparatus.

2. The management apparatus according to claim 1, wherein
in the first control, the first control unit is configured to change the communication condition regarding transmission of information from the management apparatus to the device information transmitting apparatus.

3. The management apparatus according to claim 1, wherein
in the first control, the first control unit is further configured to transmit, to the device information transmitting apparatus, an instruction to change the communication condition regarding transmission of information from the device information transmitting apparatus to the management apparatus.

4. The management apparatus according to claim 1, wherein
the device includes an air conditioner, and
the degree of priority is determined based on at least one of
an installation status of the air conditioner,
a usage status of the air conditioner,
an attribute of the air conditioner, and
a monitoring purpose of the air conditioner.

5. The management apparatus according to claim 1, further comprising:
a first notifying unit configured to notify a predetermined information output terminal that the first control is being executed when the first control unit executes the first control.

6. The management apparatus according to claim 1, wherein
the first control unit is further configured to suspend or stop the first control in response to receipt of a command to suspend or stop execution of the first control from another apparatus.

7. The management apparatus according to claim 1, wherein
the first determining unit is configured to determine the communication quality based on a reference value of the communication quality, and
the reference value is determined based on a result of measurement of the communication quality during a predetermined period.

8. The management apparatus according to claim 7, wherein
the reference value is determined by another information processing apparatus.

9. A device information transmitting apparatus that communicates with a management apparatus via a communication network under a predetermined communication condition and that transmits device information about a predetermined device, the device information transmitting apparatus comprising:
a second measuring unit configured to measure communication quality in the communication network;
a second determining unit configured to determine a degree of decrease in the communication quality; and
a second control unit configured to execute a second control to reduce an amount of communication between the management apparatus and the device information transmitting apparatus in accordance with the degree of decrease in the communication quality,
in the second control, the second control unit being configured to change the communication condition in accordance with a degree of priority of each of a plurality of pieces of information transmitted between the device information transmitting apparatus and the management apparatus.

10. The device information transmitting apparatus according to claim 9, wherein
in the second control, the second control unit is configured to change the communication condition regarding transmission of information from the device information transmitting apparatus to the management apparatus.

11. The device information transmitting apparatus according to claim 9, wherein
in the second control, the second control unit is further configured to transmit, to the management apparatus, an instruction to change the communication condition regarding transmission of information from the management apparatus to the device information transmitting apparatus.

12. The device information transmitting apparats according to claim 9, wherein
the device includes an air conditioner, and
the degree of priority is determined based on at least one of
an installation status of the air conditioner,
a usage status of the air conditioner,
an attribute of the air conditioner, and
a monitoring purpose of the air conditioner.

13. The device information transmitting apparatus according to claim 9, further comprising:
a second notifying unit configured to notify a predetermined information output terminal that the second control is being executed when the second control unit executes the second control.

14. The device information transmitting apparatus according to claim 9, wherein
the second control unit is further configured to suspend or stop the second control in response to receipt of a command of suspending or stopping execution of the second control from another apparatus.

15. The device information transmitting apparatus according to claim 9, wherein
the second determining unit is configured to determine the communication quality based on a reference value of the communication quality, and
the reference value is determined based on a result of measurement of the communication quality during a predetermined period.

16. The device information transmitting apparatus according to claim 15, wherein
the reference value is determined by another information processing apparatus.

17. The device information transmitting apparatus according to claim 10, wherein
in the second control, the second control unit is further configured to transmit, to the management apparatus, an instruction to change the communication condition regarding transmission of information from the management apparatus to the device information transmitting apparatus.

18. The device information transmitting apparats according to claim 10, wherein
the device includes an air conditioner, and
the degree of priority is determined based on at least one of
an installation status of the air conditioner,
a usage status of the air conditioner,
an attribute of the air conditioner, and
a monitoring purpose of the air conditioner.

19. The management apparatus according to claim 2, wherein
in the first control, the first control unit is further configured to transmit, to the device information transmitting apparatus, an instruction to change the communication condition regarding transmission of information from the device information transmitting apparatus to the management apparatus.

20. The management apparatus according to claim 2, wherein
the device includes an air conditioner, and
the degree of priority is determined based on at least one of
an installation status of the air conditioner,
a usage status of the air conditioner,
an attribute of the air conditioner, and
a monitoring purpose of the air conditioner.

* * * * *